US012616626B2

(12) United States Patent (10) Patent No.: US 12,616,626 B2
Hatazaki et al. (45) Date of Patent: May 5, 2026

(54) MOTION ASSIST DEVICE

(71) Applicant: FrontAct Co., Ltd., Tokyo (JP)

(72) Inventors: Kazunari Hatazaki, Tokyo (JP);
Masahiro Kasuya, Tokyo (JP); **Tatsuya
Seki**, Tokyo (JP)

(73) Assignee: FrontAct Co., Ltd., Tokyo (JP)

( * ) Notice: Subject to any disclaimer, the term of this
patent is extended or adjusted under 35
U.S.C. 154(b) by 945 days.

(21) Appl. No.: 17/797,716

(22) PCT Filed: Jan. 22, 2021

(86) PCT No.: PCT/JP2021/002265
§ 371 (c)(1),
(2) Date: Aug. 4, 2022

(87) PCT Pub. No.: WO2021/157390
PCT Pub. Date: Aug. 12, 2021

(65) Prior Publication Data
US 2023/0075880 A1 Mar. 9, 2023

(30) Foreign Application Priority Data

Feb. 6, 2020 (JP) ................................. 2020-018898

(51) Int. Cl.
*B25J 9/00* (2006.01)
*A61H 1/02* (2006.01)
(Continued)

(52) U.S. Cl.
CPC ............ *A61H 1/0288* (2013.01); *B25J 11/00*
(2013.01); *A61H 2201/0192* (2013.01);
(Continued)

(58) Field of Classification Search
CPC .. A61H 1/0288; A61H 1/0285; A61H 1/0274;
A61H 1/02; A61H 1/00;
(Continued)

(56) References Cited

U.S. PATENT DOCUMENTS 6,110,130 A * 8/2000 Kramer .................. B25J 9/0006
600/595
6,565,563 B1 * 5/2003 Agee .................... A61H 1/0288
606/55
(Continued)

FOREIGN PATENT DOCUMENTS

CN 106239485 A 12/2016
CN 112472514 A * 3/2021 ........... A61H 1/0288
(Continued)

OTHER PUBLICATIONS

Machine translation of written description and claims for
CN112472514A via google patents (Year: 2019).*
(Continued)

*Primary Examiner* — Bradley H Philips
*Assistant Examiner* — Tyler A Raubenstraw
(74) *Attorney, Agent, or Firm* — Renner, Otto, Boisselle
& Sklar, LLP

(57) ABSTRACT

This motion assist device 100 assists with flexing and
extending of fingers F1, F2 of a user, the motion assist
device 100 comprising: at least one arm 10; at least one
connection member 20 configured so as to be capable of
connecting the at least on arm 10 to each of the fingers F1,
F2; an arm support mechanism 30 that turnably supports the
at least one arm 10, the arm support mechanism 30 being
configured so as to be mountable on the back Hb of the hand
H of the user; an arm drive means 40 that causes the at least
one arm 10 to turn; and a stopper 50 that extends from the
arm support mechanism 30, the stopper 50 being configured
so as to restrict movement of the proximal phalanges of the
fingers of the user by being in contact with the proximal
phalanges. The at least one arm 10 is configured so as to turn
while the distance Dr between the at least one connection
(Continued)

member 20 and the turning center Cr of the at least one arm 10 is kept fixed.

19 Claims, 18 Drawing Sheets

(51) Int. Cl.
  *B25J 11/00* (2006.01)
  *B25J 9/10* (2006.01)
(52) U.S. Cl.
  CPC ................ *A61H 2201/1207* (2013.01); *A61H 2201/1635* (2013.01); *A61H 2201/165* (2013.01); *A61H 2201/1676* (2013.01); *A61H 2201/5069* (2013.01); *A61H 2230/085* (2013.01); *B25J 9/0006* (2013.01); *B25J 9/1045* (2013.01)
(58) Field of Classification Search
  CPC ............ A61H 2201/00; A61H 2201/01; A61H 2201/0192; A61H 2201/1207; A61H 2201/1635; A61H 2201/165; A61H 2201/1676; A61H 2201/5069; A61H 2230/085; B25J 11/00; B25J 9/00; B25J 9/0006
  See application file for complete search history.

(56) References Cited

U.S. PATENT DOCUMENTS

| | | | | |
|---|---|---|---|---|
| 10,449,677 | B1 * | 10/2019 | Al Najjar | ............... B25J 9/0006 |
| 11,246,786 | B2 * | 2/2022 | Tsui | .................... A61H 1/0288 |
| 2001/0020140 | A1 | 9/2001 | Kramer | |
| 2003/0223844 | A1 * | 12/2003 | Schiele | .................. A63B 23/12 414/5 |
| 2010/0249675 | A1 * | 9/2010 | Fujimoto | ................ G06F 3/014 601/40 |
| 2012/0059290 | A1 * | 3/2012 | Yip | ..................... A61H 1/0288 601/40 |
| 2015/0094636 | A1 * | 4/2015 | Miyazawa | .............. A61F 5/013 602/22 |
| 2015/0223959 | A1 * | 8/2015 | Cempini | ................. A61F 5/013 602/22 |
| 2016/0296345 | A1 * | 10/2016 | Deshpande | ............. A61F 2/586 |
| 2017/0042704 | A1 * | 2/2017 | Ryu | ......................... A61F 2/583 |
| 2018/0303698 | A1 * | 10/2018 | Wijesundara | ........... F15B 15/10 |
| 2019/0201273 | A1 * | 7/2019 | Soltani-Zarrin | ....... B25J 9/0006 |
| 2019/0209086 | A1 * | 7/2019 | Huang | ................. A61H 1/0288 |
| 2019/0209412 | A1 * | 7/2019 | Lindemann | .......... A61H 1/0288 |
| 2019/0332172 | A1 * | 10/2019 | Bae | ......................... G06F 3/014 |
| 2019/0350478 | A1 * | 11/2019 | Leuthardt | .......... A61N 1/36031 |
| 2020/0050269 | A1 * | 2/2020 | Gu | ......................... B25J 9/0006 |
| 2020/0121541 | A1 * | 4/2020 | Wudlick | .............. A61H 1/0288 |
| 2020/0345574 | A1 | 11/2020 | Sankai | |
| 2021/0369535 | A1 * | 12/2021 | Ishimine | .............. A61H 1/0288 |

FOREIGN PATENT DOCUMENTS

| | | | | | |
|---|---|---|---|---|---|
| JP | | 2011115248 | A | 6/2011 | |
| JP | | 201317718 | A | 1/2013 | |
| JP | | 2014519945 | A | 8/2014 | |
| JP | | 201829729 | A | 3/2018 | |
| JP | | 2002345861 | A | 12/2022 | |
| WO | | 2012176200 | A1 | 12/2012 | |
| WO | WO-2017062755 | A1 * | 4/2017 | ........... A61F 5/0118 |
| WO | | 2018055812 | A1 | 3/2018 | |
| WO | WO-2019046180 | A1 * | 3/2019 | .......... A61H 9/0092 |
| WO | | 2019078329 | A1 | 4/2019 | |

OTHER PUBLICATIONS

Extended European Search Report (EESR), including the supplementary European search report and the European search opinion for corresponding European Application No. 21750623.7 dated Jan. 30, 2024.
International Search Report for related International Application No. PCT/JP2021/002265 mailed Feb. 22, 2021 and its English Translation.
Office Action for corresponding Japanese Application No. 2020-018898 dated Jun. 5, 2020 and English machine translation.
Final Office Action for corresponding Japanese Application No. 2020-018898 dated Oct. 23, 2020 and English machine translation.
Office Action for corresponding Japanese Application No. 2021-575724 dated Feb. 21, 2022 and English machine translation.

* cited by examiner

50

(b)

(a)

(a)

(b)

MOTION ASSIST DEVICE

This application is a national phase of International Application No. PCT/JP2021/002265 filed 22 Jan. 2021, which claims priority to Japan Application No. 2020-018898 filed 6 Feb. 2020, the entireties of which are hereby incorporated by reference.

TECHNICAL FIELD

The present invention relates to a motion assistive device. The present invention particularly relates to a device for assisting the bending/stretching of a finger of a hand.

BACKGROUND ART

A device that assists the bending/stretching of a finger of a hand that no longer moves as intended has been available.

For example, Patent Literature 1 discloses a wearable motion assistive device having pivoting mechanisms corresponding to joints of each finger and an actuator for driving each pivoting mechanism as such a device for assisting finger joint movement.

CITATION LIST

Patent Literature

[PTL 1] Japanese Laid-Open Publication No. 2002-345861

SUMMARY OF INVENTION

Technical Problem

However, the conventional wearable motion assistive device described above is provided with a pivoting mechanism for each joint of each finger of a human hand. Thus, the device has problems in terms of having a large number of parts and being heavy which imposes a significant burden on users.

The objective of the present invention is to provide a motion assistive device, which has a mechanism for moving a finger that is simple and light weight with low burden on users.

Solution to Problem

The present invention provides, for example, the following items.

Item 1

A motion assistive device for assisting bending/stretching of fingers of a user, comprising:
at least one arm;
at least one connective member configured to be able to connect the at least one arm to the respective fingers;
an arm supporting mechanism for pivotably supporting the at least one arm, wherein the arm supporting mechanism is configured to be mountable on a back of a hand of the user;
arm driving means for causing the at least one arm to pivot; and
a stopper configured to extend from the arm supporting mechanism and restrict movement of a proximal phalanx of the fingers of the user by abutting the proximal phalanx;

wherein the at least one arm is configured to pivot while maintaining a constant distance between the at least one connective member and a center of pivot of the at least one arm.

Item 2

The motion assistive device of item 1, wherein the at least one connective member is configured to connect the at least one arm to a DIP joint or a middle phalanx of the fingers.

Item 3

The motion assistive device of item 1 or 2, wherein the arm supporting mechanism comprises a base member that can be mounted on the back of the hand of the user, wherein the base member has an anterior side, which is a side towards which the at least one arm extends, and a posterior side, which is the opposite side from the anterior side, wherein the base member has a flat surface that is substantially parallel to the back of the hand, and wherein the stopper is configured to be substantially parallel to the flat surface and extend towards the anterior side.

Item 4

The motion assistive device of any one of items 1 to 3, wherein the arm supporting mechanism is configured so that the center of pivot of the at least one arm is disposed on an MP joint or towards a wrist side relative to the MP joint of the fingers.

Item 5

The motion assistive device of any one of items 1 to 4, wherein
the arm supporting mechanism has:
a base member that can be mounted on the back of the hand; and
at least one attachment member, which supports the at least one arm pivotably about the center of pivot on the base member; and
the attachment member is disposed on the base member.

Item 6

The motion assistive device of item 5, wherein the arm supporting mechanism is configured so that a position and/or orientation of the base member with respect to the back of the hand can be adjusted.

Item 7

The motion assistive device of item 5 or 6, wherein the arm supporting mechanism is configured so that a position of attaching the at least one arm to the base member can be adjusted in a longitudinal direction of the fingers.

Item 8

The motion assistive device of item 7, wherein the at least one attachment member is configured so that a position where the at least one arm is fixed to the at least one attachment member can be adjusted in a longitudinal direction of the fingers.

Item 9

The motion assistive device of item 7 or 8, wherein the base member is configured so that a position where the at least one attachment is fixed to the base member can be adjusted in a longitudinal direction of the fingers.

Item 10

The motion assistive device of any one of items 5 to 9, wherein the arm supporting mechanism comprises:
an adjustment mechanism for adjusting a position and/or orientation of the center of pivot of the at least one arm.

Item 11

The motion assistive device of item 10, wherein the at least one arm comprises a plurality of arms, the plurality of arms comprising:
a first arm connected to the base member via the adjustment mechanism; and
a second arm connected to the base member without the adjustment mechanism interposed therebetween.

Item 12

The motion assistive device of item 10 or 11, wherein the adjustment mechanism comprises at least one ball joint.

Item 13

The motion assistive device of any one of items 10 to 12, wherein the adjustment mechanism is configured to be selectively attachable to both a first side and a second side of the base member.

Item 14

The motion assistive device of any one of items 1 to 13, wherein the at least one connective member is configured to connect the at least one arm to the fingers such that a tip of the fingers is exposed.

Item 15

The motion assistive device of any one of items 1 to 14, wherein the at least one connective member is made of a first material having a first rigidity and a second material having a second rigidity that is greater than the first rigidity.

Item 16

The motion assistive device of any one of items 1 to 15, wherein the at least one arm is configured to have a structure without a joint between the center of pivot and the connective member.

Item 17

The motion assistive device of any one of items 1 to 16, wherein the at least one arm has a bent shape.

Item 18

The motion assistive device of any one of items 1 to 17, wherein the motion assistive device further comprises:
a sensor for detecting a myoelectric signal that is generated when the user attempts to move a finger; and
vibration means that vibrates when the sensor has detected the myoelectric signal.

Item 19

The motion assistive device of item 18, wherein
the arm supporting mechanism comprises a first encoder for detecting a rotation angle of the at least one arm, the arm driving means comprises at least one wire connected to the respective at least one arm, a motor connected to the at least one wire, and a second encoder for detecting a rotation angle of the motor, and
the motion assistive device further comprises calculation means for calculating tension of the at least one wire based on the rotation angle detected by the first encoder and the rotation angle detected by the second encoder.

Item 20

The motion assistive device of item 19, wherein the arm driving means is configured to drive the at least one arm so as not to interfere with a movement of the fingers of the user based on the calculated tension.

Item 21

The motion assistive device of any one of items 1 to 20, wherein
the arm driving means comprises:
at least one first wire connected to the respective at least one arm; and
at least one second wire connected to the respective at least one arm; and
the fingers are bent by pulling the at least one first wire to pivot the at least one arm in one direction, and the fingers are stretched by pulling the at least one second wire to pivot the at least one arm in the opposite direction from the pivot in one direction.

Item A1

A motion assistive device for assisting bending/stretching of fingers of a user, comprising:
at least one arm;
at least one connective member configured to be able to connect the at least one arm to the respective fingers;
an arm supporting mechanism for pivotably supporting the at least one arm, wherein the arm supporting mechanism is configured to be mountable on a back of a hand of the user; and
arm driving means for causing the at least one arm to pivot;
wherein the at least one arm is configured to pivot while maintaining a constant distance between the at least one connective member and a center of pivot of the at least one arm.

Item A2

The motion assistive device of item A1, wherein the arm supporting mechanism is configured so that the center of pivot of the at least one arm is disposed on an MP joint or towards a wrist side relative to the MP joint of the fingers.

Item A3

The motion assistive device of items A1 or A2, wherein the arm supporting mechanism has:
a base member that can be mounted on the back of the hand; and
at least one attachment member, which supports the at least one arm pivotably about the center of pivot on the base member; and
the attachment member is disposed on the base member.

Item A4

The motion assistive device of item A3, wherein the arm supporting mechanism is configured so that a position of attaching the at least one arm to the base member can be adjusted in a longitudinal direction of the fingers.

Item A5

The motion assistive device of item A4, wherein the at least one attachment member is configured so that a position where the at least one arm is fixed to the at least one attachment member can be adjusted in a longitudinal direction of the fingers.

Item A6

The motion assistive device of item A4 or A5, wherein the base member is configured so that a position where the at least one attachment is fixed to the base member can be adjusted in a longitudinal direction of the fingers.

Item A7

The motion assistive device of any one of items A3 to A6, wherein the arm supporting mechanism comprises:
an adjustment mechanism for adjusting a position and/or orientation of the center of pivot of the at least one arm.

Item A8

The motion assistive device of item A7, wherein the at least one arm comprises a plurality of arms, the plurality of arms comprising:
a first arm connected to the base member via the adjustment mechanism; and
a second arm connected to the base member without the adjustment mechanism interposed therebetween.

Item A9

The motion assistive device of item A7 or A8, wherein the adjustment mechanism comprises a plurality of ball joints.

Item A10

The motion assistive device of any one of items A1 to A9, wherein the at least one connective member is configured to connect the at least one arm to the fingers such that a tip of the fingers is exposed.

Item A11

The motion assistive device of any one of items A1 to A10, wherein the at least one arm is configured to have a structure without a joint between the center of pivot and the connective member.

Item A12

The motion assistive device of any one of items A1 to A11, wherein the at least one arm has a bent shape.

Item A13

The motion assistive device of any one of items A1 to A12, wherein the motion assistive device further comprises:

a sensor for detecting a myoelectric signal that is generated when the user attempts to move a finger; and
vibration means that vibrates when the sensor has detected the myoelectric signal.

Item A14

The motion assistive device of any one of items A1 to A13, wherein
the arm driving means comprises:
at least one first wire connected to the respective at least one arm; and
at least one second wire connected to the respective at least one arm; and
the fingers are bent by pulling the at least one first wire to pivot the at least one arm in one direction, and the fingers are stretched by pulling the at least one second wire to pivot the at least one arm in the opposite direction from the pivot in one direction.

Advantageous Effects of Invention

The present invention can provide a motion assistive device, which has a mechanism for moving a finger that is simple and light weight with low burden on users.

BRIEF DESCRIPTION OF DRAWINGS

100 according to embodiment 1 shown in FIG. 6. FIG. 8(*a*) is a top view showing base member 31, arm 10, and attachment member 30*a* viewed from direction A in FIG. 5. FIG. 8(*b*) is a side view showing the structures of these members viewed from direction D in FIG. 8(*a*).

FIG. 9(*a*) is a top view showing these members, and FIG. 9(*b*) is a side view showing the structures of these members viewed from direction D in FIG. 9(*a*).

FIG. 11(*a*) is a perspective view of the pivot axis adjustment mechanism 30*c* viewed from the same angle as FIG. 5. FIG. 11(*b*) shows the pivot axis adjustment mechanism 30*c* shown in FIG. 11(*a*) decomposed into parts.

FIG. 12(*a*) shows the ball joints B1 and B2 in an assembled state, and FIG. 12(*b*) shows the ball joints B1 and B2 in a decomposed state.

DESCRIPTION OF EMBODIMENTS

First, the motion assistive device of the invention is conceptually described.

Figure 1A:
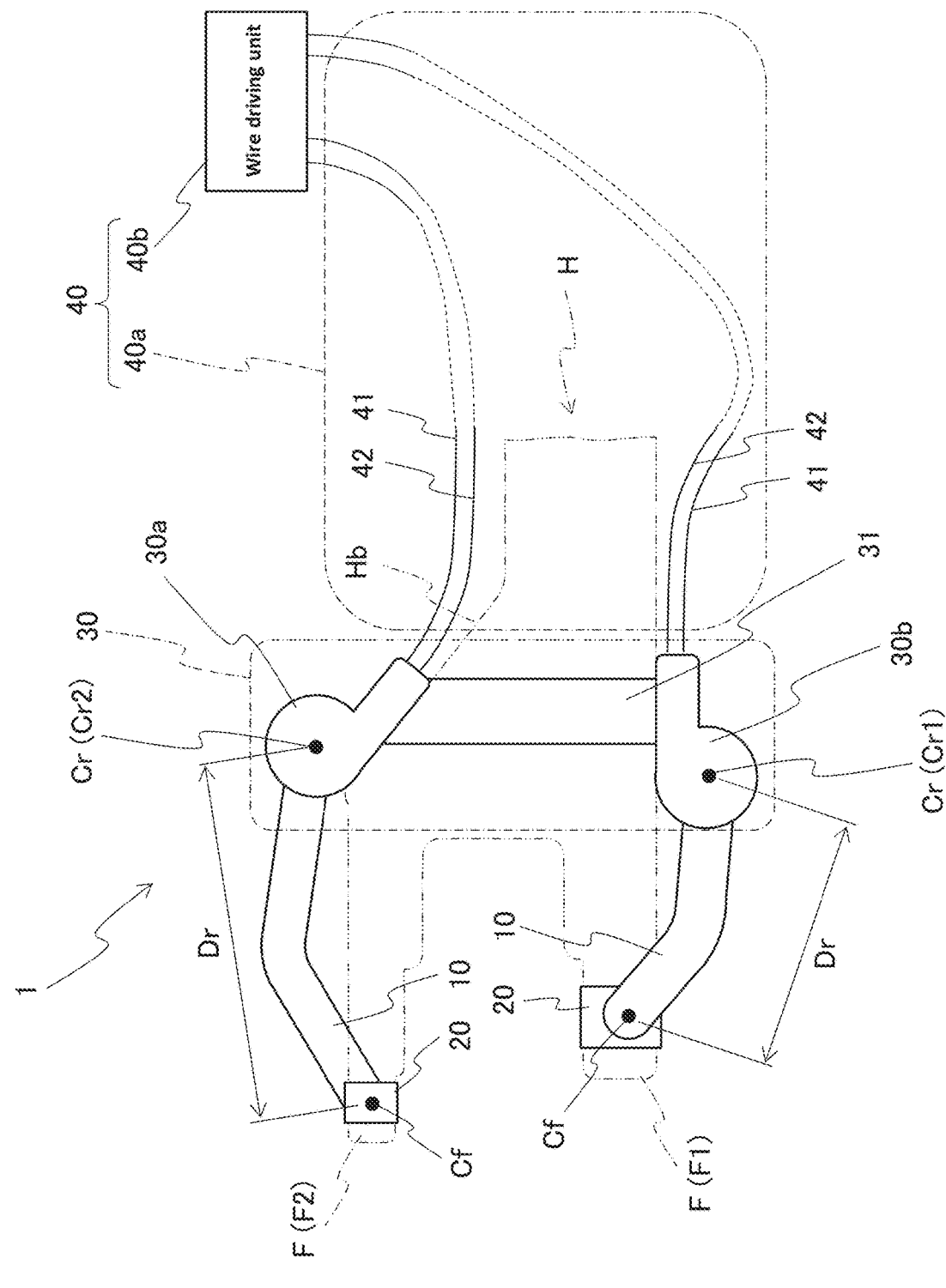
FIG. 1A is a schematic diagram for describing an example of the configuration of motion assistive device 1 of the invention, which conceptually shows the motion assistive device 1.

FIG. 1A is a schematic diagram for describing an example of the configuration of a motion assistive device 1 of the invention, which conceptually shows the motion assistive device 1.

The problem to be solved by the invention is to provide a motion assistive device, which has a mechanism for moving a finger that is simple and light weight with low burden on users. The present invention has solved the problem by providing a motion assistive device 1 for assisting bending/stretching of fingers of a user, comprising:

at least one arm 10;

at least one connective member 20 configured to be able to connect the at least one arm 10 to the respective fingers F (e.g., thumb F1 and index finger F2);

an arm supporting mechanism 30 for pivotably supporting the at least one arm 10, wherein the arm supporting mechanism 30 is configured to be mountable on a back Hb of a hand H of the user; and arm driving means 40 for causing the at least one arm to pivot 10;

wherein the at least one arm 10 is configured to pivot while maintaining a constant distance Dr between the at least one connective member 20 and a center of pivot Cr (Cr1, Cr2) of the at least one arm 10.

Figure 1B:
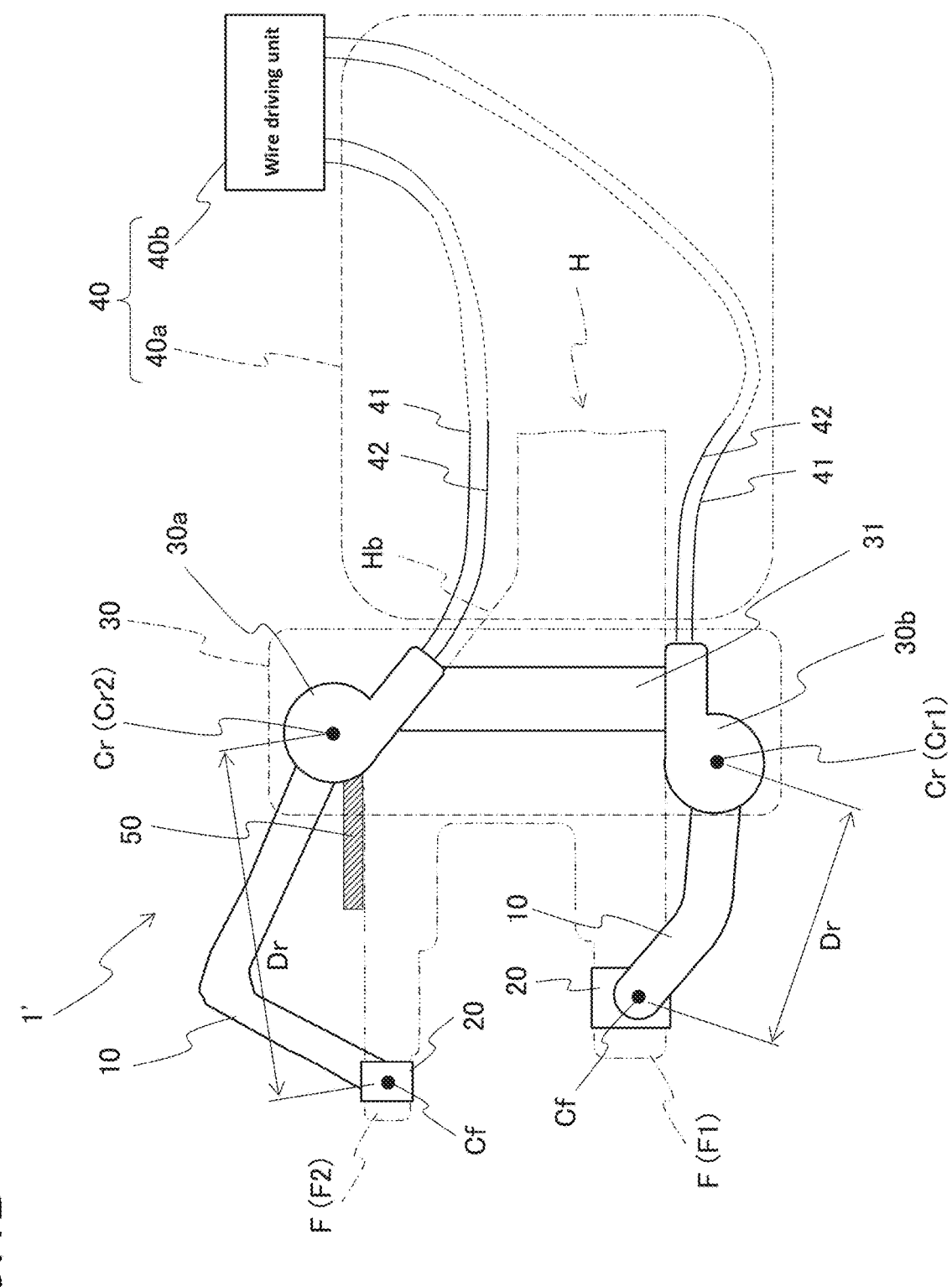
FIG. 1B is a schematic diagram for describing an example of another configuration of motion assistive device 1 of the invention (motion assistive device 1'), which conceptually shows the motion assistive device 1'.

FIG. 1B is a schematic diagram for describing an example of another configuration of the motion assistive device 1 of the invention (motion assistive device 1'), which conceptually shows the motion assistive device 1'. The configuration of the motion assistive device 1' can be the same as the configuration of the motion assistive device 1, except for comprising a stopper 50. Therefore, the following descriptions for the motion assistive device 1 also apply to the motion assistive device 1'. The arm 10 is shown to have a shape of a greater-than sign (<) (or a caret symbol (^)) in FIG. 1A, while the arm 10 for the index finger F2 is shown to have a substantially L-shape in FIG. 1B.

The stopper 50 is configured to extend from the arm supporting mechanism 30 and restrict the movement of a proximal phalanx (portion between an MP joint and PIP joint (or IP joint)) of the fingers of the user by abutting the proximal phalanx. The motion assistive device 1' can efficiently move a finger of a user by restricting the movement of the proximal phalanx of the finger of the user with the stopper 50. When, for example, a finger of a user is to be pulled up, i.e., a finger is moved to open a clutched finger, with the motion assistive device 1', the stopper 50 can abut a proximal phalanx to restrict the movement of a finger about an MP joint while promoting the movement about a PIP joint or DIP joint.

The connective member 20 of the motion assistive device 1' is preferably configured to connect at least one arm 10 to a DIP joint of a finger or a middle phalanx of a finger (portion between a DIP joint and PIP joint) because this configuration can more efficiently move the finger of a user. When, for example, a finger of a user is to be pulled up, i.e., a finger is moved to open a clutching finger, by the at least one arm 10 connected to a DIP joint or middle phalanx of the finger, the finger can be fully opened by pulling up the distal phalanx of the finger (a portion distal to a DIP joint (or IP joint)). Pulling up a finger of a user with at least one arm 10 connected to the DIP joint or middle phalanx of the finger can be combined with restriction of movement of a proximal phalanx by the stopper 50 to fully open the finger of the user efficiently, because the stopper 50 abutting the proximal phalanx can suppress the movement of the finger about the MP joint while the at least one arm 10 connected to the DIP joint or middle phalanx of the finger pulling up the distal phalanx can promote the movement about the PIP joint and DIP joint.

Figure 1C:
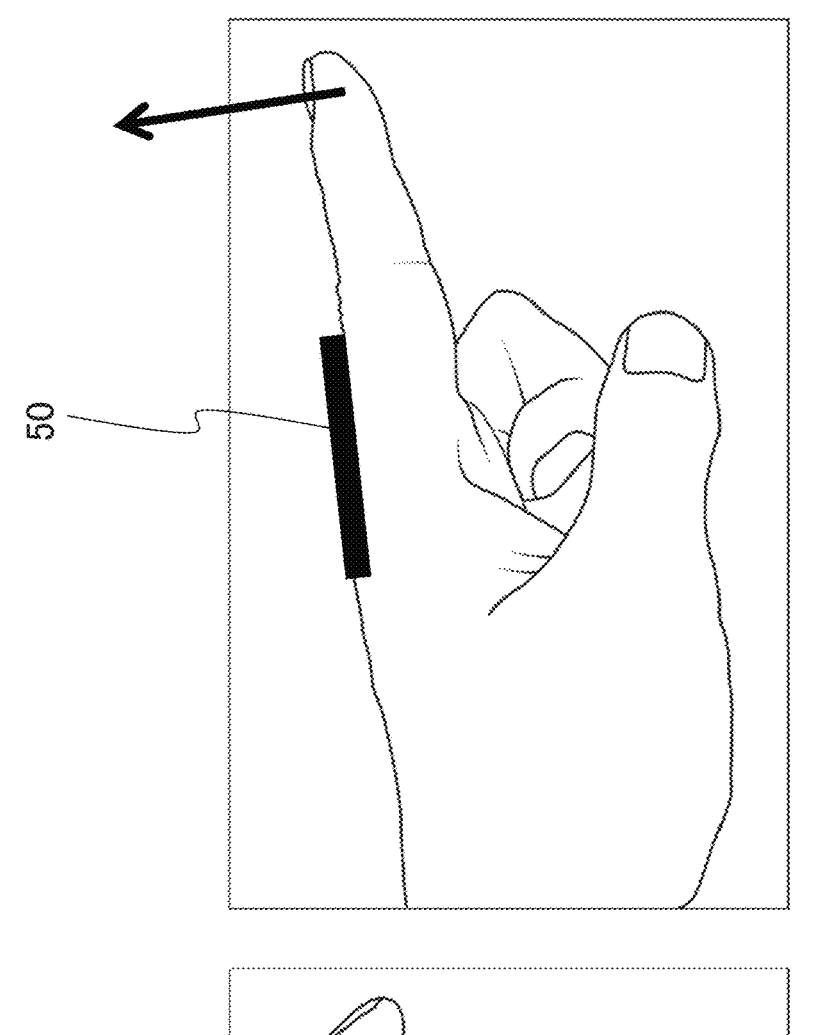
FIG. 1C is a diagram showing a distal phalanx of a finger being pulled up to open a finger, which mimics the state of a finger of a patient with flexion contracture.
Figure 1C:
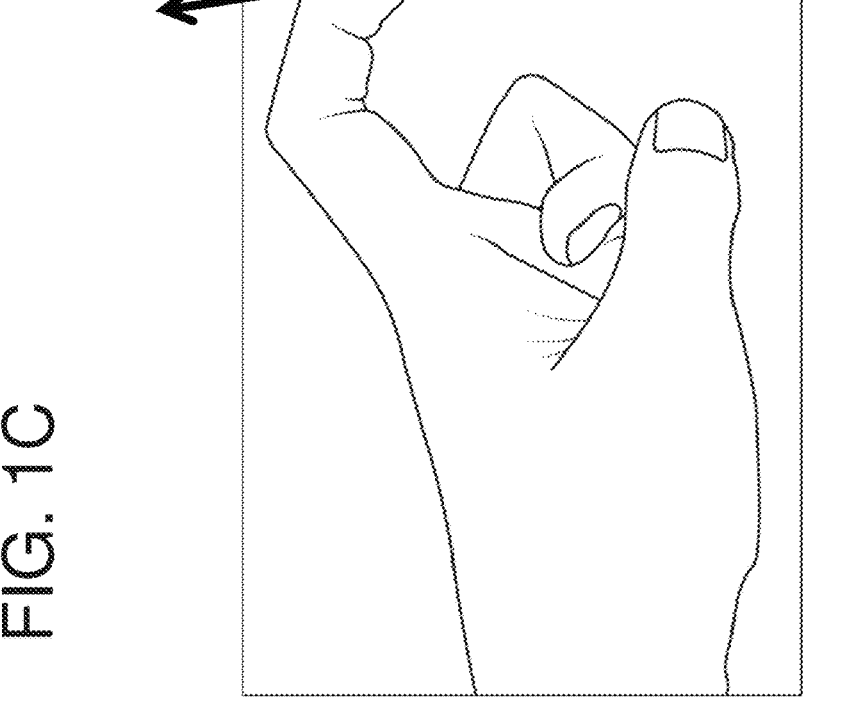

Such a configuration is particularly useful for, for example, a patient with finger flexion contracture. FIG. 1C is a diagram showing a distal phalanx of a finger being pulled up to open a finger, which mimics the state of a finger of a patient with flexion contracture. In FIG. 1C, the motion assistive device 1 is not mounted on the hand to simplify the description.

If, for example, a distal phalanx of a finger of a patient with flexion contracture is pulled up to stretch the finger of the patient with flexion contracture, the finger only moves about the MP joint, but cannot be moved about the PIP joint or DIP joint, so that the finger cannot be fully stretched in some cases, as shown in FIG. 1C(a). Even in such a case, the stopper 50 can restrict the movement of the proximal phalanx of the finger and suppress the movement of the finger about the MP joint to promote movement about the PIP joint and DIP joint to allow the finger of the patient with flexion contracture to fully open, as shown in FIG. 1C(b). This can be helpful in, for example, rehabilitation of hands and fingers of patients with flexion contracture.

Figure 2:
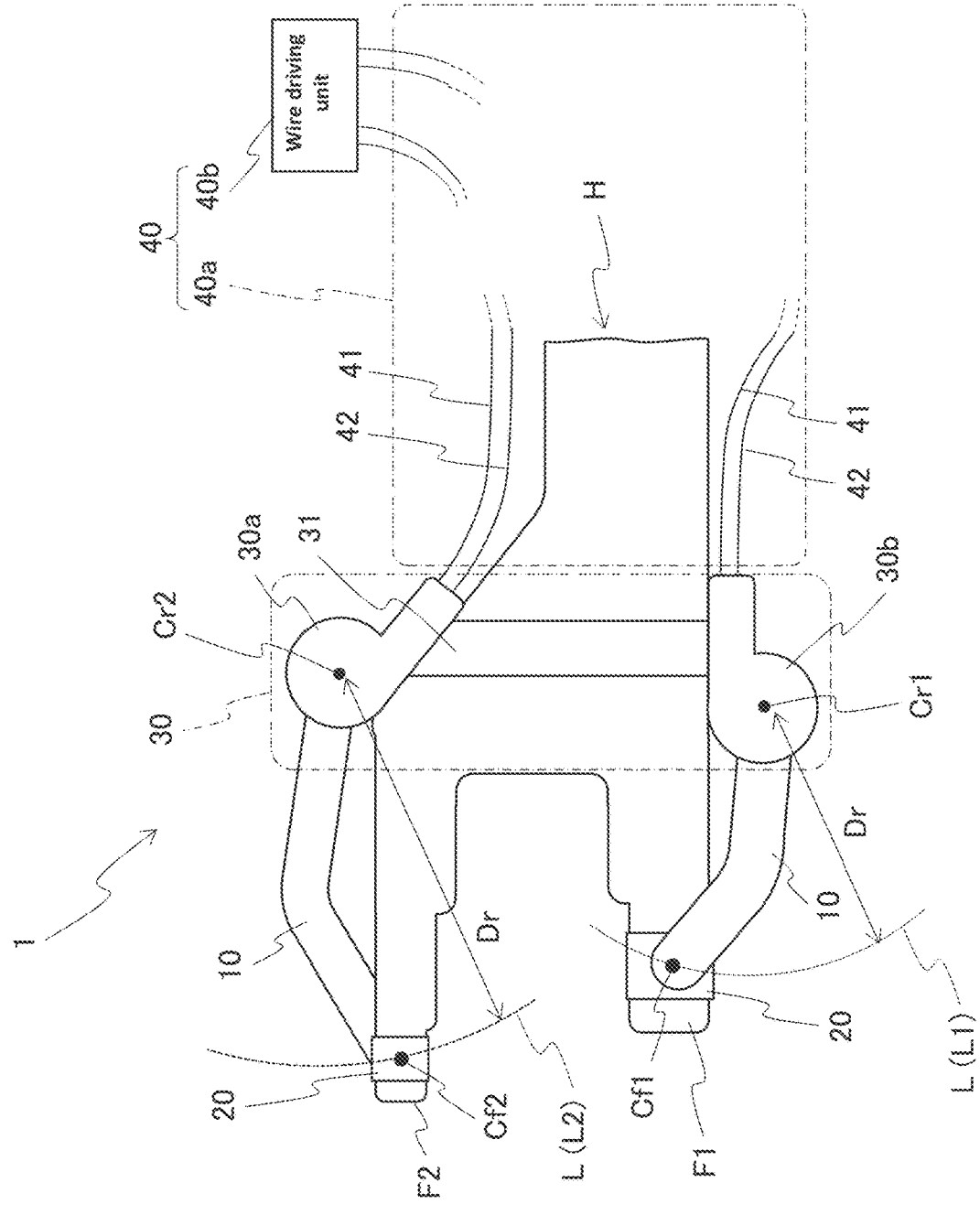
FIG. 2 is a diagram that describes the motion of the motion assistive device 1 shown in FIG. 1A, which schematically shows index finger F2 and thumb F1 being stretched by each arm 10 of the motion assistive device 1.
Figure 3:
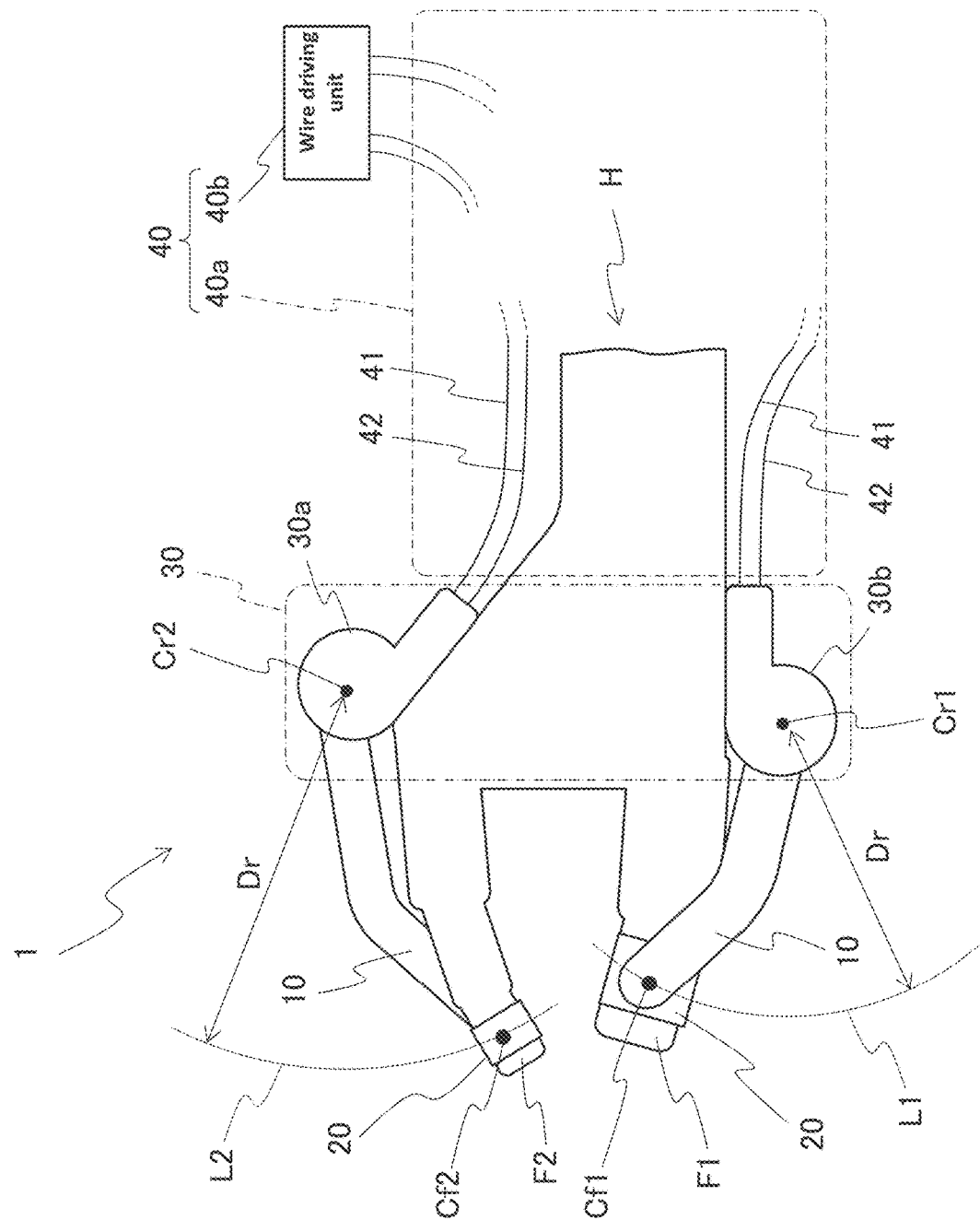
FIG. 3 is a diagram that describes the motion of the motion assistive device 1 shown in FIG. 1A, which schematically shows index finger F2 and thumb F1 starting to be bent by pivoting of each arm 10 of the motion assistive device 1.
Figure 4:
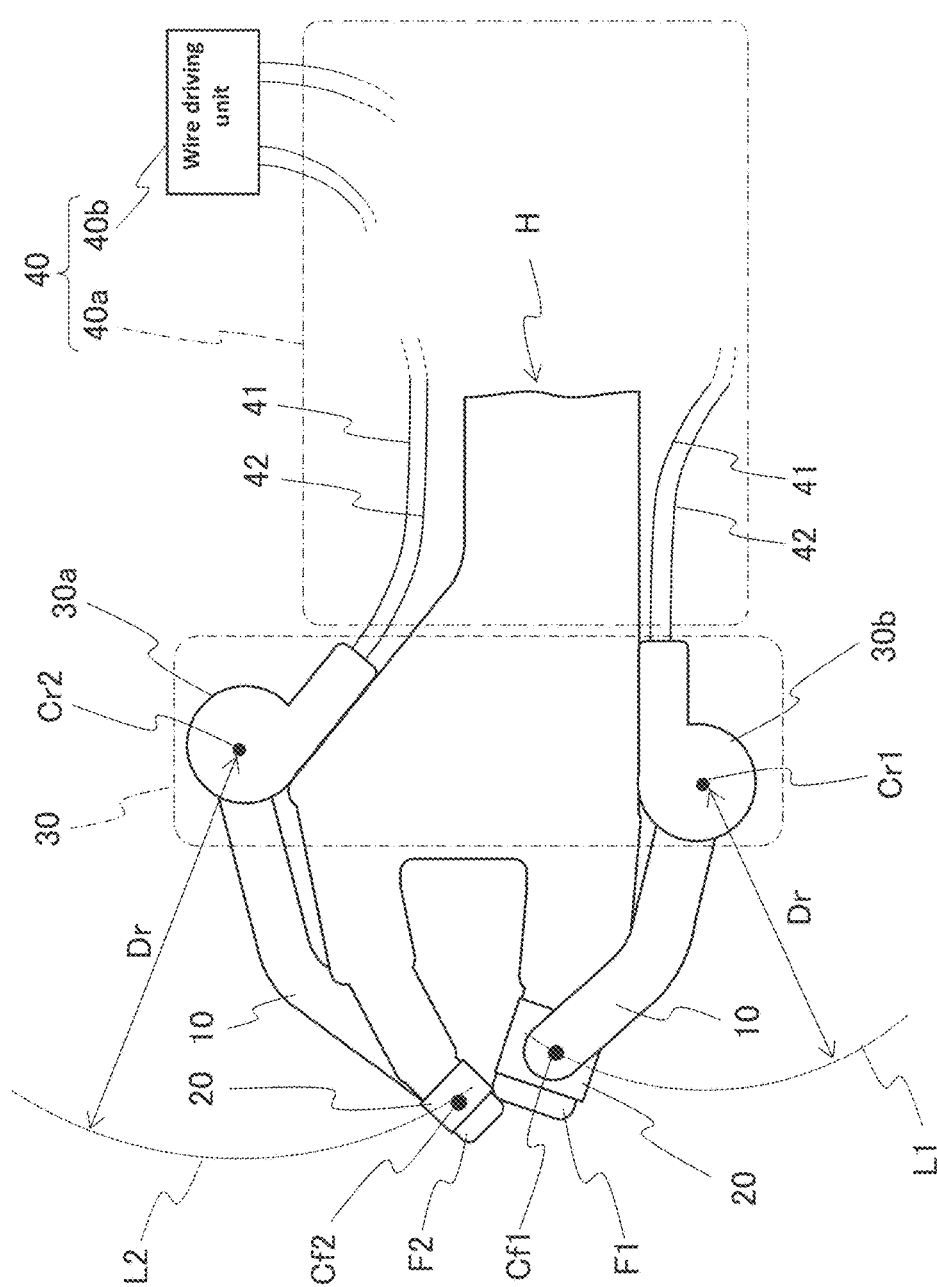
FIG. 4 is a diagram that describes the motion of the motion assistive device 1 shown in FIG. 1A, which schematically shows the index finger F2 and thumb F1 being bent until their tips contact each other by further pivoting of each arm 10 of the motion assistive device 1.

FIGS. 2 to 4 are diagrams that describe the motion of the motion assistive device 1 shown in FIG. 1A. FIG. 2 shows the index finger F2 and thumb F1 in a stretched state. FIG. 3 shows the index finger F2 and thumb F1 starting to be bent. FIG. 4 shows the index finger F2 and thumb F1 being bent until their tips contact each other.

The motion assistive device 1 with such a configuration can move the finger F with a simple configuration, wherein the arm 10 supported by the arm supporting mechanism 30 is pivoted by the arm driving means 40, by which positions Cf1 and Cf2 of attaching the connective members 20 attached to the arms 10 of the thumb F1 and index finger F2 (i.e., tip of the thumb F1 and tip of the index finger F2) move on circumferences L1 and L2 centered around the centers of pivot Cr1 and Cr2 of the respective arms 10 as shown in FIGS. 2 to 4, so that one arm pivots about one center of pivot. In such a motion assistive device 1 of the invention, a part of a link is substituted with the skeletal structure of the users themselves, whereby the problem associated with a large size and complexity, which was an issue in conventional art that constructs the entire link with a machine, can be solved. Further, the connective member 20 maintains a constant distance with respect to the center of pivot while an arm is pivoting, so that the trajectory of the fingertip would always be the same in bending/stretching movements of fingers by the user, whereby the fingers F can be moved repeatedly on a unique trajectory with precision.

For example, the arm 10 connected to the index finger F2 is supported by an attachment member 30*a* of the arm supporting mechanism 30, and the arm 10 connected to the thumb F1 is supported by an attachment member 30*b* of the arm supporting mechanism 30. Precise movement of the index finger F2 and thumb F1 connected to the arms 10 enable elaborate operations such as picking up or holding a small object with the index finger F2 and the thumb F1.

In the motion assistive device 100, a pivoting portion corresponding to a joint of a human finger is only the arm supporting mechanism 30. With only one pivoting portion, the mechanism for moving a finger can be configured to be simple and light weight.

Thus, the specific configuration of the arm 10, connective member 20, arm supporting mechanism 30, and arm driving means 40 in the motion assistive device 1 of the invention is not particularly limited and can have any configuration, as long as the arm 10 pivotably supported by the arm supporting mechanism 30 is connected to the finger F by the connective member 20 and pivoted by the arm driving means 40, wherein the at least one arm 10 pivots while maintaining a constant distance Dr between the connective member 20 and the center of pivot Cr of the at least one arm 10.

Figure 13:
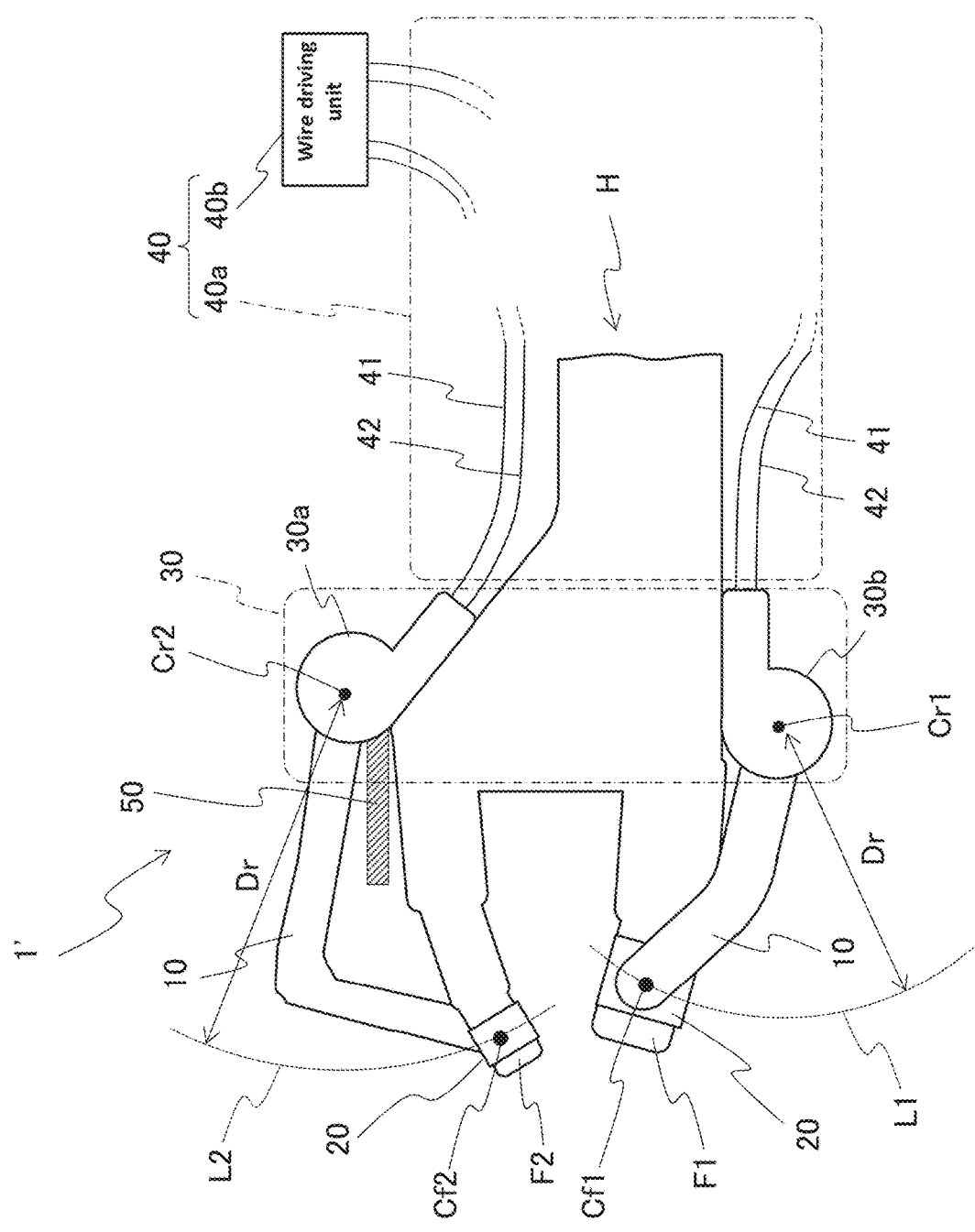
FIG. 13 is a diagram that describes the motion of the motion assistive device 1' shown in FIG. 1B, which shows the index finger F2 and thumb F1 in a bent state.
Figure 14:
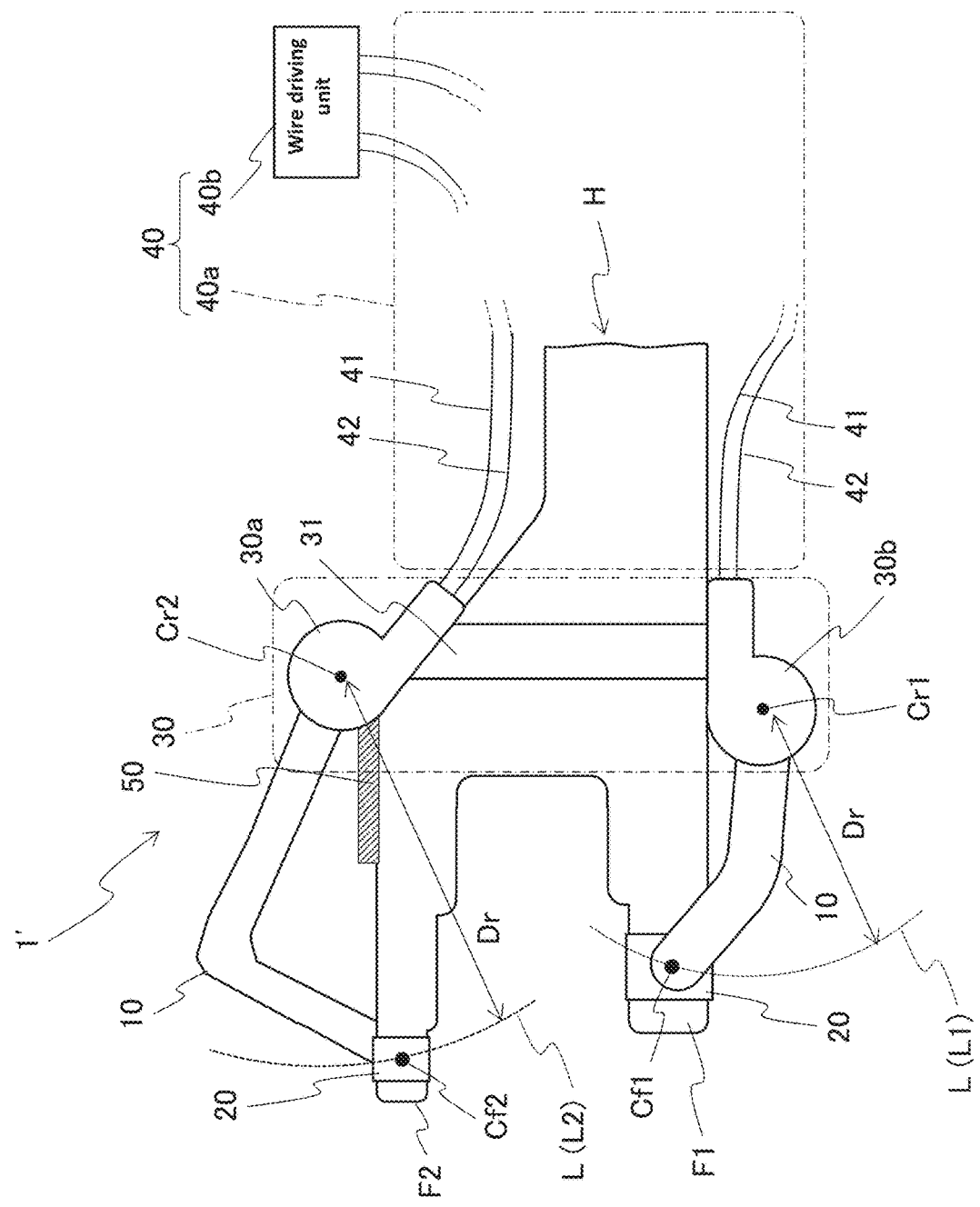
FIG. 14 is a diagram that describes the motion of the motion assistive device 1' shown in FIG. 1B, which shows the index finger F2 and thumb F1 in a stretched state.

FIGS. 13 to 14 are diagrams that describe the motion of the motion assistive device 1' shown in FIG. 1B. FIG. 13 shows the index finger F2 and thumb F1 in a bent state. FIG. 14 shows the index finger F2 and thumb F1 in a stretched state.

The motion assistive device 1' with such a configuration can move the finger F with a simple configuration that causes one arm to pivot about one center of pivot in the same manner as the motion assistive device 1. When the index finger F2 is stretched from the state shown in FIG. 13 to the state shown in FIG. 14, the proximal phalanx of the index finger F2 abuts the stopper 50 as shown in FIG. 14, whereby the movement of the proximal phalanx of the index finger F2 about the MP joint is restricted. The index finger F2 would then be moved about the PIP joint or DIP joint, resulting in the index finger F2 to be fully stretched.

This is particularly useful for patients with flexion contracture as described above. Without the stopper 50, a finger with flexion contracture, when pulled up by the arm 10, would only be pulled up about the MP joint, and the finger cannot be moved about the PIP joint or DIP joint, so that the finger cannot be fully opened. Even in such a case, the stopper 50 can restrict the movement of the proximal phalanx of the finger and suppress the movement of the finger about the MP joint to promote movement about the PIP joint and DIP joint to fully open the finger of the patient with flexion contracture.

In the motion assistive device 1' shown in FIGS. 13, 13, and 14, interference of the arm 10 by the stopper 50 is avoided due to the shape of the arm 10 for the index finger F2 having a substantially L-shape. Means for avoiding interference of the arm 10 by the stopper 50 is not limited thereto. Interference of the arm 10 by the stopper 50 can be avoided, for example, by the arm 10 having a shape other than a substantially L-shape (e.g., curved shape or substantially J-shape). Interference of the arm 10 by the stopper 50 can be avoided, for example, by the stopper 50 having a plurality of separate structures for each finger instead of a structure that is continuous in the direction traversing the hand. Interference of the arm 10 by the stopper 50 can be avoided, for example, by providing a slit to the stopper 50, through which the arm 10 can pass through.

In the motion assistive device 1' shown in FIGS. 13, 13, and 14, a stopper corresponding to the thumb F1 is not depicted, but the motion assistive device 1' may comprise a stopper that restricts the movement of the proximal phalanx of the thumb F1.

In the following descriptions of a configuration shared by the five fingers (e.g., the thumb F1, index finger F2, etc. described above), each of the five fingers is indicated as finger F, a center of pivot of each finger and the arm 10 corresponding to each finger is indicated as Cr, the position of attaching the connective member 20 to each finger and the arm 10 corresponding to each finger is indicated as Cf, and the trajectory of each finger is indicated as L.

(Arm 10)

In the motion assistive device 1 of the invention, the at least one arm 10 may be one arm 10 that is connected to one finger F of the five fingers, or two arms which are the arm 10 connected to the thumb F1 and the arm 10 connected to the index finger F2 as shown in FIG. 1A, or the at least one arm 10 may comprise arm 10 connected to at least one other finger.

The constituent material and the shape of the arm 10 are not particularly limited and can be any material or shape, as long as the connective member 20 that connects the finger F to the arm 10 is moved while maintaining a constant distance Dr from the center of pivot Cr of the arm 10. For example, at least one of metal, plastic, wood, ceramic, etc. or a combination thereof may be used as the constituent material of the arm 10. The shape of the arm is also not particularly limited. The shape may be linear, arcuate, bent, or curved. In a preferred embodiment, the arm 10 has a shape of a greater-than sign (<) (or a caret symbol (^)) that is bent in a direction of enveloping the hand side. The angle of the bend can be any angle between 0° to 180°, such as 90°, 120°, 135°, or 150°. With such a configuration, interference of the finger F or back Hb of the hand H (e.g., webbing of fingers) by the arm 10 when the arm 10 is pivoted in a direction towards which the finger F bends can be suppressed, so that the finger F can be smoothly bent. With a constant distance Dr from the center of pivot Cr of the arm 10 to the position Cf where the connective member 20 is attached, the finger F connected to the arm 10 by the connective member 20 can be bent on a unique trajectory in accordance with the pivoting of the arm 10.

The arm 10 can also have any structure. In one embodiment, the arm 10 is comprised of a tabular member without a joint between the center of pivot thereof and the connective member 20. For example, the arm 10 is comprised of a single tabular member without a joint between the center of pivot thereof and the connective member 20. For example, the arm 10 is comprised of a plurality of members without a joint between the center of pivot thereof and the connective member 20. With such a configuration, a complex mechanism is not required for pivoting of an arm, thus enabling a simple and light weight structure. However, the present invention is not limited thereto. The arm 10 may have a joint between the center of pivot and the connective member.

If the arm 10 is comprised of a plurality of members, each of the plurality of members can be movably coupled to configure the length of the arm 10 to be variable, whereby the length of the arm 10 can be adjusted in accordance with the length of a finger of a hand of a user.

Furthermore, the shape of the arm 10 may be tabular or rod-shaped. In a preferred embodiment, the arm 10 is a tabular member. The arm 10 that is configured as a tabular member makes it easier to place the arm 10 along the side surface of the finger F instead of placing the arm 10 on the top surface side of the finger F. Placement of the arm 10 along the side surface of the finger F not only achieves a sense of unity with the finger, but also allows suppression of interference of the finger F by the arm 10 when the arm 10 is pivoted in the direction towards which the finger F bends. To achieve a light weight, the arm 10 may be hollow, or a slit or hole may be provided, to the extent that a given strength is maintained.

(Connective Member 20)

The constituent material and shape of the connective member 20 are not particularly limited, as long as the connective member 20 can connect the finger F to the arm 10. For example, the connective member 20 may be made of a fabric, leather, resin, paper, or rubber. The shape of the connective member 20 may be tabular, belt-like, or annular.

In one embodiment, the connective member 20 can be made of a plurality of materials. For example, the connective member 20 can be made of a plurality of materials with different rigidities. The connective member 20 can be made of, for example, a first material having a first rigidity and a second material having a second rigidity that is greater than the first rigidity. The first material with a first rigidity is a material that is softer than the second material. Examples thereof include, but are not limited to, fabric, leather, natural fiber, synthetic fiber (e.g., nylon), resin (e.g., PTFE), etc. The first material can be, for example, a hook-and-loop fastener (e.g., Velcro®). The material with a second rigidity is a material that is harder than the first material. Examples thereof include, but are not limited to, glass, resin (e.g., nylon resin and ABS), etc. The second material can be, for example, glass filled Nylon 66.

For example, a plurality of materials constituting the connective member 20 can be selected to achieve a desired property. In a preferred embodiment, a portion of the connective member 20 that abuts the pulp of the finger F can be made of a material with a high rigidity (i.e., hard material), and the other portions can be made of a material with a low rigidity (i.e., soft material), whereby the connectivity of the arm 10 and the finger F can be improved while maintaining ease of mounting the connective member 20 on the finger F. For example, in order to enhance the effect of rehabilitation upon rehabilitating the body of a patient, it is effective to detect the intent to move the body and assist the movement of the body in accordance with the intent. In doing so, it is preferable to assist the movement of the body with high responsiveness in order to maximize the effect of rehabilitation. Improvement in the connectivity of the arm 10 and the finger F results in immediate transmission of a driving force by the arm 10 to the finger F, so that the response rate can be improved.

The position on a finger of a user where the connective member 20 is mounted can be any position. In one embodiment, the connective member 20 may be disposed around a DIP joint of the finger F, around a PIP joint of the finger F, or between the DIP joint and PIP joint of the finger F. In a preferred embodiment, the connective member 20 is disposed around the DIP joint or between the DIP joint and PIP joint of the finger F. The bend of the DIP joint is suppressed by disposing the connective member 20 around the DIP joint or between the DIP joint and PIP joint, so that a "pinching" motion can be smoothly performed. This can also efficiently assist a motion to "open" the finger F.

Any method can be used to connect the connective member 20 to a finger. For example, the method may be a method of wrapping a belt-like connective member around a finger, a method of inserting a finger into an annular connective member, or a method of fixing a connective member with a tabular shape, etc. to a finger (e.g., nail) with an adhesive, etc. In one embodiment, the connective member 20 is a resin belt, which has a resin buckle and is able to adjust the tightening strength, but the configuration is not limited thereto. In another embodiment, the connective member 20 has a hook-and-loop fastener.

In a preferred embodiment, the connective member 20 is attached to be rotatable with respect to the arm 10. By rotating the connective member 20 with respect to the arm 10, it is possible to avoid the posture of the finger F with respect to the arm 10 to be fixed in the same posture by the connective member 20, and eliminate the risk of pivoting of the arm 10 to result in discomfort such as tightening of the finger F by the connective member 20 fixed to the arm 10.

In a preferred embodiment, a connective member is configured to connect an arm to a finger such that the tip of a finger is exposed. With such a configuration, the tip of the finger F (fingertip) would not be covered by the connective member 20. Thus, the tip of the thumb F1 and the tip of the index finger F2 would directly contact an object when grabbing the object. Therefore, such a configuration can allow a user to have a greater sense of grabbing an object.

(Arm Supporting Mechanism 30)

As long as the arm supporting mechanism 30 pivotably supports the at least one arm 10, the other configurations of the arm supporting mechanism 30 are not particularly limited and can have any configuration.

The arm supporting mechanism 30 has, as a configuration for pivotably supporting the arm 10, a base disposed on a back of a hand and an attachment member for pivotably attaching the arm to the base.

In this regard, the base is, for example, the base member 31 that can be mounted on a portion of the hand of a user other than the finger of the hand (e.g., back of hand Hb). In a preferred embodiment, a base member is fixed to the hand H of a user by a fixing member.

Any material or shape can be used for a base member. At least one of metal, plastic, wood, ceramic, etc. or a combination thereof may be used as the constituent material of a base member. To achieve a light weight, a base material may be hollow, or a slit or a hole may be provided, to the extent that a given strength is maintained.

A fixing member can be of any form, such as a belt or string made of leather, fabric, resin, etc., or a peelable adhesive member made of silicone, etc.

For example, an arm supporting mechanism is configured so that the position and/or orientation of a base member with respect to the back of a hand of a user can be adjusted, whereby the base member can be adjusted in accordance with the size and/or shape of the hand of the user. For example, the position of a base member can be adjusted in a longitudinal direction of a hand of a user in accordance with the size of the hand. For example, any mechanism can be used as a mechanism for adjusting the position and/or orientation of a base member that can adjust the orientation of the base member on a flat surface that is parallel to the back of the hand in accordance with the shape of a user. Such an arm supporting mechanism can be achieved by, for example, configuring the position and/or orientation of a base member with respect to a fixing member to be adjustable.

An attachment member supports at least one arm pivotably about a center of pivot on a base member. The attachment member can have any form to the extent that it can be disposed on the base member 31. For example, an attachment member may have an axial member fixed to a base (base member) and pivotably support one end of the arm 10 by the axial member, or may have a flexible member attached to a base and pivotably support one end of an arm by the flexible member. In this regard, the flexible member can be, for example, a flat spring, coiled spring, a resilient frame member, etc., but the present invention is not limited thereto.

In this manner, one of the features of the finger assistive device of the invention is in allowing the posture and position of a finger to be uniquely determined in accordance with the bending/stretching of the finger by configuring a dual link system with one link as the arm 10 and the other link as the skeletal structure of the finger of the user.

The at least one arm 10 can be disposed at any position. In a preferred embodiment, the arm supporting mechanism 30 is configured so that a center of pivot of the at least one arm 10 is disposed on the MP joint (joint at the base of the finger F) or towards a wrist side relative to the MP joint of the finger F. The MP joint can be moved in accordance with bending/stretching of a finger by disposing a pivot axis on the MP joint (joint at the base of the finger F) or towards a wrist side relative to the MP joint of the finger F in this manner. Furthermore, all joints including PIP joints and DIP joints can be bent at a certain ratio in accordance with the bending/stretching of a finger by disposing a pivot axis on the MP joint (joint at the base of the finger F) or towards a wrist side relative to the MP joint of the finger F and disposing a connective member around the DIP joint. As a result, a "pinching" motion can be smoothly performed.

Such a configuration of the arm supporting mechanism 30 can be materialized by, for example, disposing an attachment member on the base member 31 that can be mounted on the back of the hand Hb and configuring the attachment member so that at least one arm is supported pivotably about a center of pivot on the base member.

Furthermore, the arm supporting mechanism 30 may be configured so that a position of attaching at least one arm to the base member 31 can be adjusted in a longitudinal direction of a finger. With such a configuration, the position of the center of pivot of the arm can be adjusted in accordance with the size of a hand of a user. As an example of a configuration that can adjust the position of attaching the arm 10 to the base member 31, an attachment member may be configured so that the position of fixing an arm to the attachment member 30a or 30b can be adjusted in the longitudinal direction of a finger, or the base member 31 may be configured so that the position of fixing the attachment member 30a or 30b to the base member 31 can be adjusted in the longitudinal direction of a finger.

The arm supporting mechanism 30 may be configured where the attachment member 30a or 30b is configured so that the position of fixing the arm 10 to the attachment member 30a or 30b can be adjusted in the longitudinal direction of a finger, and the base member 31 is configured so that the position of fixing the attachment member 30a or 30b to the base member 31 can be adjusted in the longitudinal direction of a finger.

However, the present invention is not limited thereto. For example, the arm supporting mechanism 30 may be configured so that the position of attaching the at least one arm 10 to the base member 31 cannot be adjusted.

The arm supporting mechanism 30 may also comprise an adjustment mechanism for adjusting the position and/or orientation of a pivot axis of the arm 10. In such a case, the arm 10 may comprise an arm connected to the base member 31 via a pivot axis adjustment mechanism (e.g., arm 10 supporting the thumb F1) and an arm connected to the base member 31 without a pivot axis adjustment mechanism interposed therebetween (e.g., arm 10 supporting the finger F other than the thumb F1). Alternatively, all arms 10 may be connected to the base member 31 via a pivot axis adjustment mechanism.

In this regard, the pivot axis adjustment mechanism may comprise one or more ball joints, but this is not limited to ball joints. When fixing two members, the pivot axis adjustment mechanism may have a connection mechanism that can freely set the posture of one member with respect to the other member instead of ball joints.

A pivot axis adjustment mechanism can be configured, for example, to be selectively attachable to both a first side and a second side of the base member 31. In this regard, by configuring the arm 10 supporting the thumb F1 to be connected to the base member 31 via a pivot axis adjustment mechanism, one motion assistive device 1 can be constructed for both hands. For example, if a pivot axis adjustment mechanism is attached to a first side (e.g., left side of a central axis of a base that is parallel to the longitudinal direction of a hand) of the base member 31, the motion assistive device 1 would be a motion assistive device for one of the hands (e.g., right hand) because the arm 10 supporting the thumb F1 would be on the left side of the base member 31 when the base member 31 is mounted on the back of a hand. In contrast, if for example a pivot axis adjustment mechanism is attached to a second side (e.g., right side of a central axis of a base that is parallel to the longitudinal direction of a hand) of the base member 31, the motion assistive device 1 would be a motion assistive device for the other hand (e.g., left hand) because the arm 10 supporting the thumb F1 would be on the right side of the base member 31 when the base member 31 is mounted on the back of a hand.

If the motion assistive device 1 comprises a plurality of arms 10 and a plurality of attachment members, the plurality of attachment members may be attached to a base member so that the space between each of the plurality of attachment members can be adjusted, whereby the space between the plurality of arms 10 can be adjusted in accordance with the spaces between fingers of a user.

(Arm Driving Means 40)

The arm driving means 40 is not particularly limited, as long as the pivotably supported arm 10 is pivoted. The specific structure thereof can be any structure.

For example, the arm driving means 40 may have a wire portion 40*a* comprising a wire that is directly or indirectly connected to the arm 10 and a wire driving unit 40*b* for pulling the wire.

The wire portion 40*a* may be configured to have two wires that are first and second wires 41 and 42 attached to an attachment member pivotably supporting the arm 10 on the base member 31, wherein the finger F is bent by pulling the first wire 41 to pivot the arm 10 in one direction, and finger F is stretched by pulling the second wire 42 to pivot the arm 10 in the opposite direction from the pivot in one direction.

Means for pulling a wire (wire driving unit 40*b*) may be attached to a portion of a body of a user other than the hand, or provided away from the body of the user. In this regard, the means for pulling a wire may comprise a motor, pneumatic or hydraulic piston, or electromagnet as a source of a driving force. Furthermore, arm driving means may be attached to a hand of a user. In such a case, the arm may be coupled to a source of a driving force such as a motor or piston of the arm driving means in a link mechanism that does not use a wire. In a preferred embodiment, a wire driving unit is provided at a portion other than the body (especially the hand) of a user. Such a configuration would not necessitate a user to bear the weight of a wire driving unit, so that a finger can be moved more smoothly.

The motion assistive device 1 may further comprise a sensor for detecting a myoelectric signal that is generated when a user attempts to move a finger, and vibration means that vibrates when the sensor has detected the myoelectric signal.

While the arm driving means 40 detects an intent of a user to move a finger from a biological signal such as a myoelectric signal or brain wave to drive the arm 10, there is a time lag from the detection of the intent to the actual driving of the arm 10. In such a case, the user may feel incongruent about the arm 10 not moving immediately even if a finger is attempted to be moved. As a method of improving such a situation, it can be effective to apply a vibration to the hand H of the user by vibration means concurrently with the detection of a myoelectric signal. Vibration means can generate vibrations nearly concurrently with the intent of a user to reduce the feeling of incongruity of the user due to a time lag for driving the arm 10.

In one embodiment, the arm supporting mechanism 30 may further comprise a first encoder for detecting a rotation angle of the arm 10, and the arm driving means 40 may further comprise a second encoder for detecting a rotation angle of a motor of the wire driving unit 40*b*. The rotation angle of a motor can be indirectly detected by, for example, a second encoder detecting a rotation angle of a pulley attached to the motor. In this embodiment, the motion assistive device 1 can further comprise calculation means for calculating tension of the wire portion 40*a* based on the rotation angle detected by the first encoder and the rotation angle detected by the second encoder. For example, if the rotational motion of the arm 10 is against the rotational motion of the motor, a difference is generated between the rotational angle of the motor and the rotational angle of the arm 10. This difference can be used as an indicator for tension acting on the wire portion 40*a*. In this configuration, the calculation means can calculate the tension acting on the wire portion 40*a* without using a force sensor, so that the configuration is useful in simplifying the configuration of the motion assistive device 1.

The tension calculated by calculation means can be used in the motion assistive device 1 for controlling the motion assistive device 1 in various applications. For example, tension can be used for a torque limiter so that an excessive force would not be applied to a finger of a user. For example, tension can be used so that a user can hold an object with a constant force regardless of the size of the object that is held. For example, tension can be used so that the force of assistance can be adjusted in accordance with the recovery of a user (e.g., patient in rehabilitation). For example, tension can be used to control the motion assistive device 1 so that the movement of the motion assistive device 1 does not interfere with the movement of a user. This can be achieved by, for example, controlling to drive the motion assistive device 1 so as to cancel out the resistance inherent to the motion assistive device 1 due to interference of constituent elements of the motion assistive device 1 with one another, etc., whereby the user can move the hand or fingers as if the motion assistive device 1 is not worn. Such a control mode is referred to as a motion sensing mode herein. It is preferable to control the motion assistive device 1 in a motion sensing mode when, for example, a user is moving a hand or finger within the extent that the user can move under their own ability. With such a configuration, the motion assistive device 1 can be configured to avoid obstructing the movement of a user, within the extent that the user can move under their own ability, when assisting the movement of the hand or fingers of the user. This can lead to high efficiency of rehabilitation of a user. Further, false recognition in biological signal sensing can be reduced by controlling in a motion sensing mode instead of detecting an intent of a user to move a finger from a biological signal such as a myoelectric signal or brain wave to drive the arm 10, within the extent that the user can move under their own ability.

The following embodiments show the motion assistive device 1 wherein a source of a driving force (wire driving unit) of the arm driving means 40 is disposed in the periphery of a user and the driving force of the source of driving force of the arm driving means 40 is transmitted to the arm 10 by the wires 41 and 42. Further, the arm supporting mechanism 30 has the base member 31 that can be mounted on the back of a hand and attachment members 30*a* and 30*b* that support the arm 10 pivotably about a center of pivot on the base member 31, and can adjust the position of fixing the attachment members 30*a* and 30*b* to the base member 31 and the position of fixing the arm 10 to the attachment members 30*a* and 30*b* in the longitudinal direction of the finger F. Furthermore, the arm 10 is comprised of a structure without a joint between a center of pivot and a connective member.

The embodiments of the present invention are described hereinafter with reference to the drawings.

Embodiment 1

Figure 5:
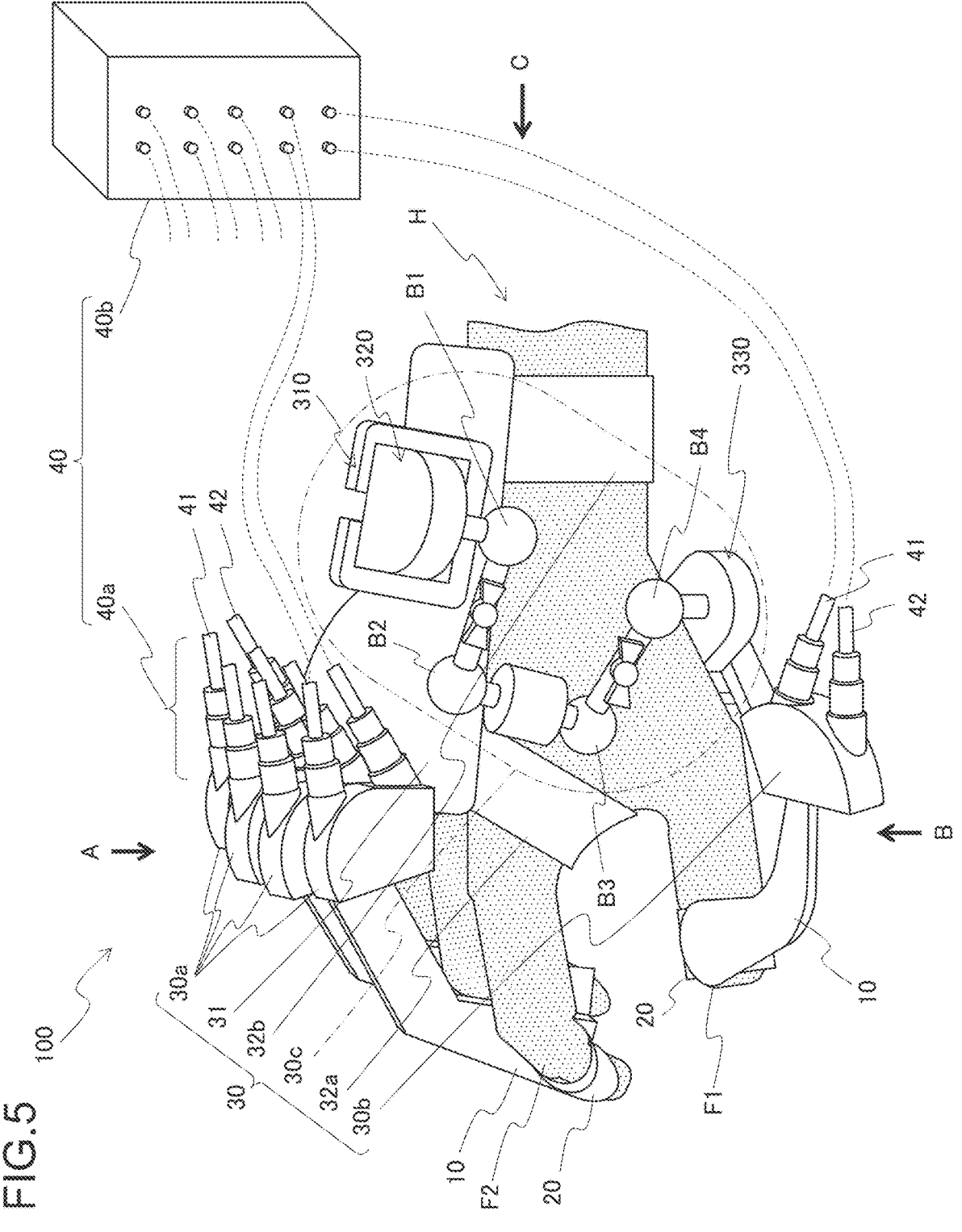
FIG. 5 is a perspective view that describes motion assistive device 100 according to embodiment 1 of the invention, which schematically shows the motion assistive device 100 being worn on hand H of a user.
Figure 6:
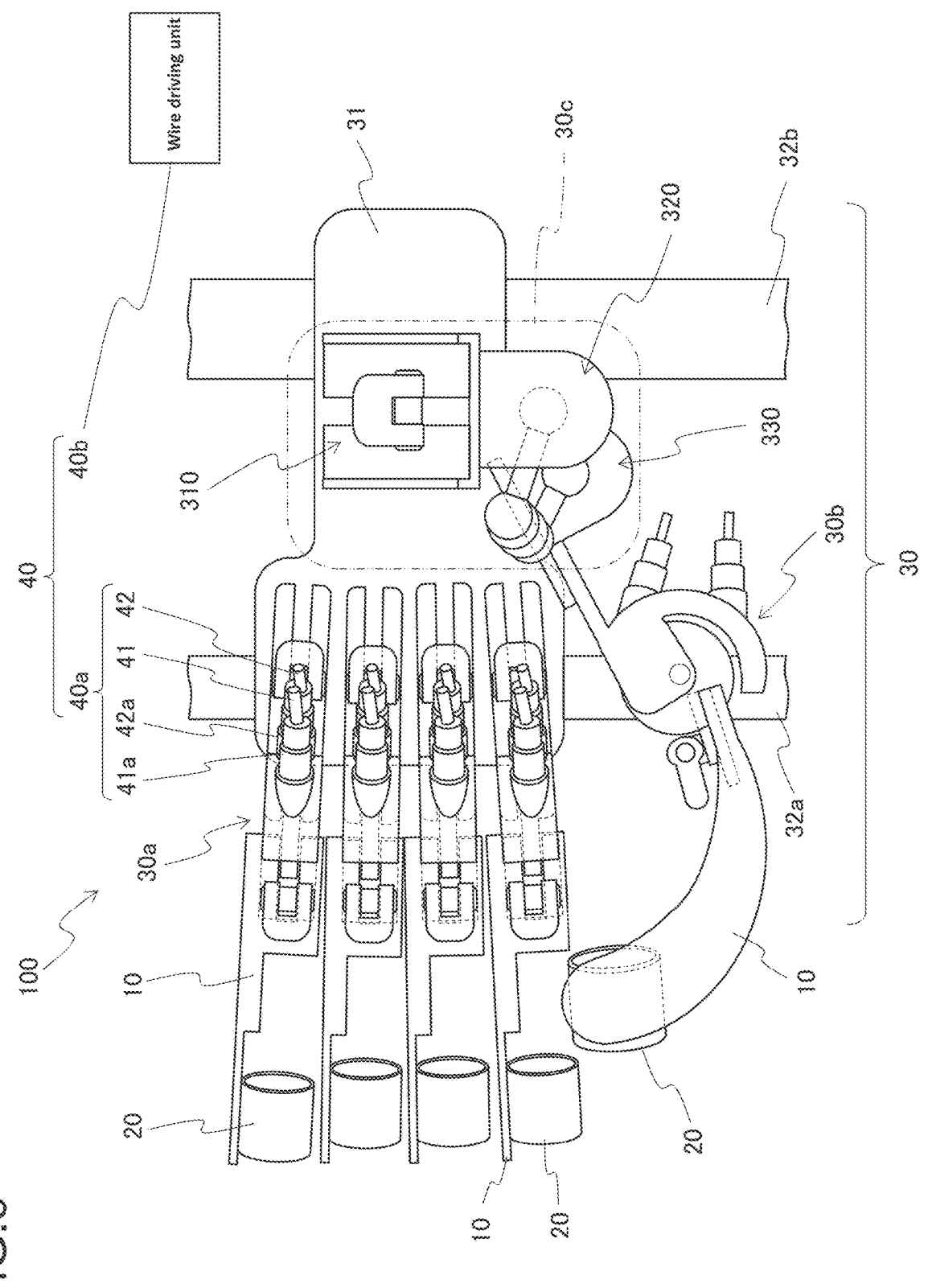
FIG. 6 is a top view of the motion assistive device 100 according to embodiment 1 shown in FIG. 5, which specifically shows the structure of the motion assistive device 100 viewed from direction A in FIG. 5.
Figure 7:
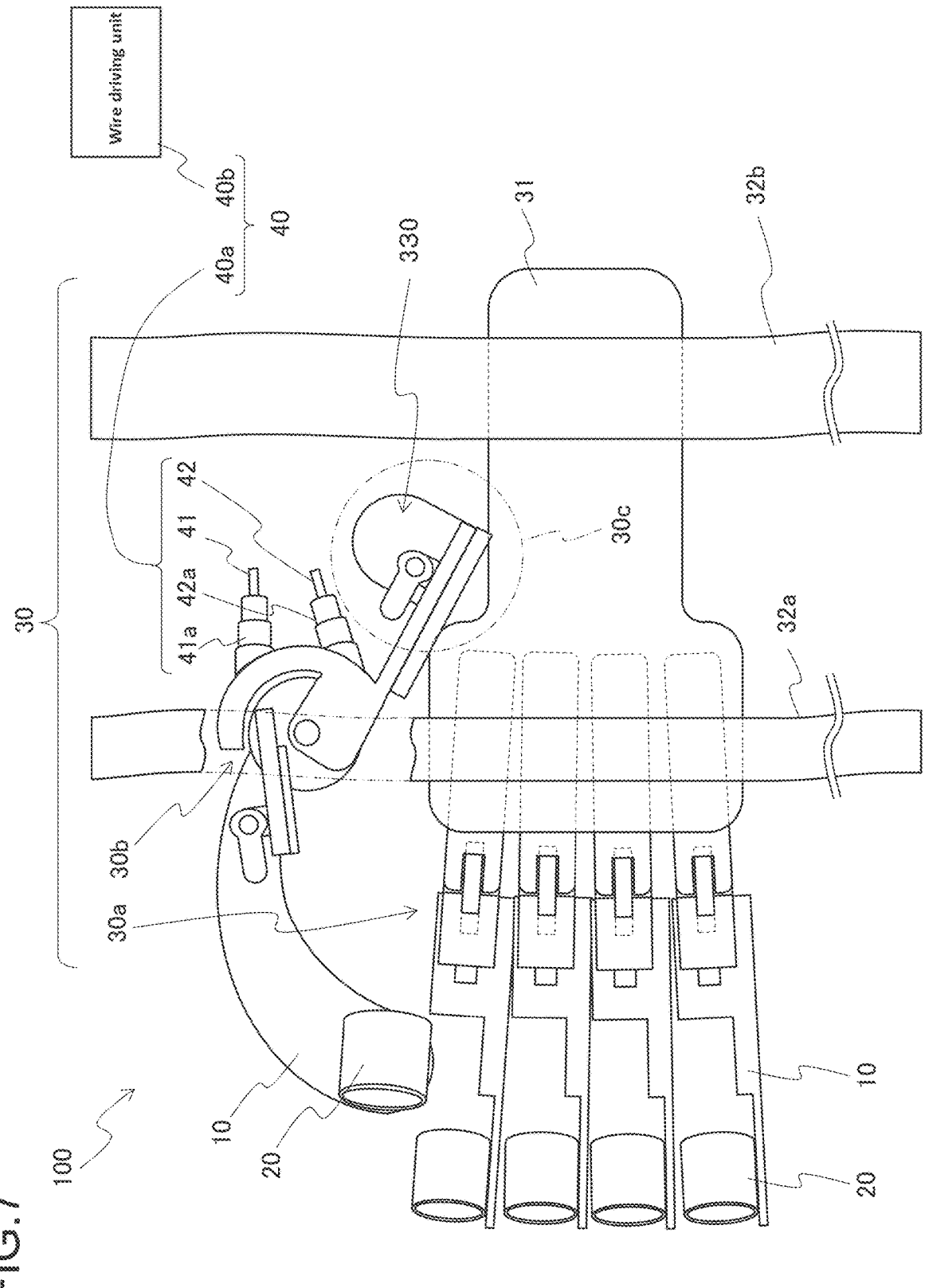
FIG. 7 is a bottom view of the motion assistive device 100 according to embodiment 1 shown in FIG. 5, which specifically shows the structure of the motion assistive device 100 viewed from direction B in FIG. 5.

FIG. 5 is a perspective view that describes the motion assistive device 100 according to embodiment 1 of the invention, which schematically shows the motion assistive device 100 being mounted on the hand H of a user. FIGS. 6 and 7 are a top view and a bottom view of the motion assistive device 100, respectively. FIG. 6 specifically shows the structure of the motion assistive device 100 viewed from direction A in FIG. 5. FIG. 7 specifically shows the structure of the motion assistive device 100 viewed from direction B in FIG. 5.

The motion assistive device 100 according to embodiment 1 assists bending/stretching of a finger of a user. One of the applications thereof is, for example, rehabilitation of a finger of a hand when the user is a person with a functional disorder. Another application can be assisting movement for a user with a weak finger in a hand. An applied technology of the motion assistive device of the invention can be measurement of the movable range of a joint of a finger when a user voluntarily bends/stretches the finger, an interface for controlling driving of a hand of a remote controlled robot having an arm such as an avatar robot, etc. For example, a motor is used as driving means for a motion assistive device in the embodiments herein, but the angle of the motor (degree of openness/closedness of fingers) can be constantly monitored by inactivating the motor. This can be utilized to measure the movable range of a joint when a user bends/stretches the finger by a voluntary movement.

A hand of an avatar robot can be driven based on the angle of a motor of driving means (degree of openness/closedness of fingers) obtained by a movement of a user wearing a motion assistive device, and a finger of the user can also be moved based on information on force of a hand of an avatar robot by feeding back the information on force to a motion assistive device. As a result, the motion assistive device can be an interface for controlling driving of the hand of the avatar robot.

The motion assistive device 100 comprises the arm 10, the connective member 20 for connecting the finger F to the arm 10, the arm supporting mechanism 30 for pivotably supporting the arm 10, and the arm driving means 40 for causing the arm 10 to pivot, wherein the arm 10 is configured to pivot while maintaining a constant distance between the connective member 20 and a center of pivot of the arm 10.

In this regard, the arm 10 and the connective member 20 are each provided to each of five fingers F1 to F5 of the hand H of a user. The arms 10 and the connective members 20 corresponding to any finger have the same configuration. However, the motion assistive device 100 does not necessarily need to comprise the arm 10 and the connective member 20 corresponding to all five fingers, and may comprise only those corresponding to the thumb F1, only those corresponding to the index finger F2, or only those corresponding to other fingers of the five fingers.

Furthermore, the arm 10 is configured to have a structure without a joint between the center of pivot thereof and the connective member 20. As shown in FIG. 5, the entire arm is comprised of one tabular member having a bent shape of a greater-than sign (<) (or a caret symbol (^)) as a whole. At the tip of the arm 10, a belt member that can adjust the tightening strength is attached as the connective member 20. The arm 10 can be connected to the thumb F1 or the index finger F2 by wrapping the belt member 20 around and fixing, for example, a portion that is distal to the first joint of a finger (see, for example, the thumb F1 and index finger F2 in FIG. 5). The base portion of the arm 10 is pivotably supported by the arm supporting mechanism 30. In this regard, the belt member, as the connective member 20, has a structure that can connect the arm 10 to the finger F such that the tip of the finger F is exposed. However, the arm 10 may be comprised of a plurality of tabular members or at least one rod-shaped member.

In the motion assistive device 100, the portion that is distal to the first joint of the fingers other than the thumb F1 and index finger F2 (middle finger F3, ring finger F4, and pinky finger F5) is also fixed to the tip of a first frame piece 10a of the arm 10 by the connective member 20 in the same manner as the index finger F2. The base portion of the arms 10 corresponding to the fingers F3 to F5 is pivotably supported by the arm supporting mechanism 30.

Therefore, the arm 10 of each finger is supported by the arm supporting mechanism 30 to pivot while maintaining a constant distance Dr (see FIG. 1) between the position Cf of attaching the connective member 20 and the center of pivot Cr of the arm 10 in the motion assistive device 100.

The arm supporting mechanism 30 can specifically comprise the base member 31, four attachment members 30a corresponding to the fingers F2 to F5 other than the thumb, and one attachment member 30b corresponding to the thumb F1.

The arm supporting mechanism may also have fixing members 32a and 32b for fixing the base member 31 to the hand H of a user. When a fixing member is provided, the fixing member may be only one of the fixing members 32a and 32b.

In this regard, the fixing member can be in any form, as long as the base member 31 can be fixed to the hand H of a user. A fixing member may be made of, for example, a fabric, leather, resin, paper, or rubber. The shape of the fixing member may be tabular, belt-like, or annular. The method of fixing a hand of a fixing member can be any method. For example, the method may be a method of wrapping a belt-like fixing member around a hand, a method of inserting a hand in an annular fixing member, or a method of fixing a fixing member with a tabular shape to a hand with an adhesive, etc. In one embodiment, fixing members are a back hand side fixing member 32a, which is attached to a portion of the base member 31 that covers a part of the back Hb of the hand H, and a wrist side fixing member 32b, which is attached to a portion of the base member 31 that contacts the wrist of a user. The back hand side fixing member 32a has a belt-like structure that can be wrapped around on the palm and fixed by MAGIC TAPE®, a buckle, etc. The wrist side fixing member 32b has a belt-like structure that can be wrapped around on the wrist and fixed by a hook-and-loop fastener (e.g., MAGIC TAPE® or Velcro®), a buckle, etc.

The arm supporting mechanism 30 can be configured so that the position and/or orientation of the base material 31 with respect to the back of the hand can be adjusted. This can be materialized by, for example, the configuration shown in FIG. 15.

Figure 15:
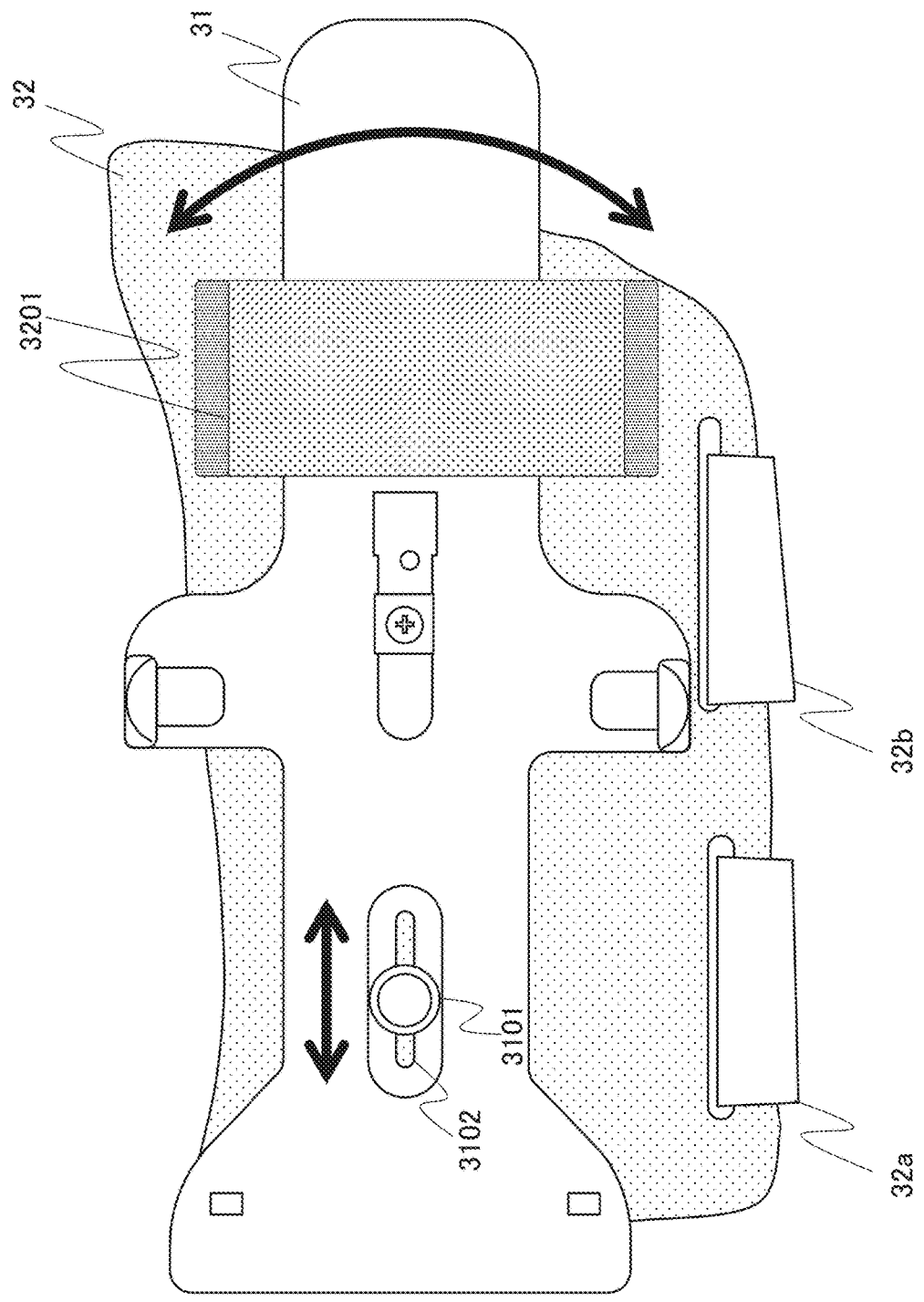
FIG. 15 is a top view of an example of the base member 31 and fixing member 32 of the arm supporting mechanism 30.

FIG. 15 is a top view of an example of the base member 31 and fixing member 32 of the arm supporting mechanism 30. When the motion assistive device 100 is mounted on a hand of a user, the right side of FIG. 15 would be the direction towards which a finger of the user extends. Specifically, the base member 31 has an anterior side, towards which the at least one arm 10 extends (right side of FIG. 15), and a posterior side, which is the opposite side from the anterior side (left side of FIG. 15) in the motion assistive device 100. The base member 31 has a flat surface that is substantially parallel to the back of a hand of a user when mounted on the hand of the user.

The base member 31 comprises fixing means 3101 and a slot 3102. The fixing means 3101 passes through the slot 3102 and is fixed to the fixing member 32, whereby the base member 31 can move relatively with respect to the fixing member 32 only by the length of the slot 3102. Since the fixing member 32 is fixed to the back of the hand of a user by the back hand side fixing member 32a and the wrist side fixing member 32b, the move of the base member 31 relative to the fixing member 32 would thus be a move relative to the back of the hand. With such a configuration, the position of the base member 31 relative to the back of the hand can be adjusted.

The fixing member 32 comprises a member 3201 that covers the base member 31. The member 3201 is fixed to the fixing member 32 at both ends, whereby a channel for the base member 31 to pass through can be formed between the fixing member 32 and the member 3201. The base member 31 can move within the channel. With such a configuration, the base member 31 can pivot relative to the fixing member 32 with the fixing means 3101 as the pivot point. Since the fixing member 32 is fixed to the back of the hand of a user by the back hand side fixing member 32a and the wrist side fixing member 32b, pivoting of the base member 31 relative to the fixing member 32 would thus be pivoting relative to the back of the hand. With such a configuration, the orientation of the base member 31 relative to the back of the hand can be adjusted.

Four attachment members 30a corresponding to the fingers F2 to F5 other than the thumb F1 are fixed to the base member 31, which is the foundation of the arm supporting mechanism 30, and the arms 10 are pivotably supported by their respective attachment members 30a. The attachment member 30b corresponding to the thumb F1 is preferably fixed to the base member 31 via the pivot axis adjustment mechanism 30c, and the arm 10 is pivotably supported by the attachment member 30b. The pivot axis adjustment mechanism 30c constitutes a part of the arm supporting mechanism 30. By having one or more ball joints, the position and/or orientation of a pivot axis of the arm 10 corresponding to the thumb F1 can be adjusted in various orientations. By comprising a pivot axis adjusting mechanism that can adjust the position and/or orientation of a pivot axis in this manner, it is possible to be compatible with positions and orientations of fingers that are different depending on the person or movement of a finger required to be moved in a more complex motion (position or orientation) than other fingers such as the thumb. However, the present invention is not limited thereto. A pivot axis adjustment mechanism may be used for a movement of a finger other than the thumb. It is possible to be compatible with more diverse positions and complex orientations by increasing the number of ball joints. The embodiment shown in FIG. 5 describes a case where four ball joints are provided, but the number of ball joints may be four or more, or rather three, two, or one.

For example, the pivot axis adjustment mechanism 30c can be configured to be selectively attachable to both a first side and a second side of the base member 31. At this time, one motion assistive device 100 can be configured to be for both hands by connecting the arm 10 supporting the thumb F1 to the base member 31 via the pivot axis adjustment mechanism 30c. For example, if the pivot axis adjustment mechanism 30c is attached to a first side (e.g., left side of a central axis of a base that is parallel to the longitudinal direction of a hand) of the base member 31, the motion assistive device 100 would be a motion assistive device for one of the hands (e.g., right hand) because the arm 10 supporting the thumb F1 would be on the left side of the base member 31 as shown in FIG. 5 when the base member 31 is mounted on the back of a hand. In contrast, if for example the pivot axis adjustment mechanism 30c is attached to a second side (e.g., right side of a central axis of a base that is parallel to the longitudinal direction of a hand) of the base member 31, the motion assistive device 100 would be a motion assistive device for the other hand (e.g., left hand) because the arm 10 supporting the thumb F1 would be on the right side of the base member 31 when the base member 31 is mounted on the back of a hand.

The arm supporting mechanism 30 may also be configured so that a position of attaching the arm 10 to the base member 31 can be adjusted in a longitudinal direction of fingers (direction towards which the arm 10 extends). As a specific embodiment that enables the position of attaching the arm 10 to the base member 31 to be adjusted in a longitudinal direction of fingers (direction towards which the arm 10 extends), the base member 31 may be configured so that the position of fixing the attachment members 30a and 30b to the base member 31 can be adjusted in the longitudinal direction of the finger F (direction towards which the arm 10 extends), or the attachment members 30a and 30b may be configured so that the position of fixing the arm 10 to the attachment members 30a and 30b can be adjusted in the longitudinal direction of the finger F (direction towards which the arm 10 extends). The arm supporting mechanism 30 may also have each of the two mechanisms for adjusting the position of attaching the arm 10 described above.

In the motion assistive device 100, the arm supporting mechanism 30 is configured so that the pivot axis of each arm 10 is disposed on the MP joint (joint at the base of a finger) or towards a wrist side relative to the MP joint of the finger F, as shown in FIGS. 1 to 5.

Such a configuration of the arm supporting mechanism 30 is materialized by, for example, disposing the attachment members 30a and 30b on the base member 31 mounted on the back of the hand Hb and configuring the attachment members 30a and 30b so that each supports an arm pivotably about a center of pivot on the base member 31.

The arm driving means 40 drives the arms 10 pivotably attached to the four attachment members 30a corresponding to the fingers F2 to F5 and the attachment member 30b corresponding to the thumb F1, wherein the arm driving means has the wire portion 40a comprising a pair of wires (first wire 41 and second wire 42) that move each arm 10 and the wire driving unit 40b for pulling the pair or wires that move each arm 10. In this regard, the wire portion 40a comprises the first wire 41 and the second wire 42 connected to the wire driving unit 40b and a mechanism for coupling the wires to the arm 10, and converts a driving force of the wire driving unit 40b into a rotational force of the arm 10 by the first wire 41 and the second wire 42 to cause the arm 10 to pivot in one direction or the opposition direction thereof by the driving force of the wire driving unit 40b.

The motion assistive device 100 may also have a sensor (not shown) for detecting a myoelectric signal that is generated when a user attempts to move a finger, vibration means that vibrates when the sensor has detected the myoelectric signal, and a controller (not shown) for controlling the wire driving unit 40b to pull the first and second wires 41 and 42 connected to the arm 10 corresponding to a given finger based on the detection of the myoelectric signal by the sensor. While the arm driving means 40 detects an intent of a user to move a finger from a myoelectric signal, brain wave, etc. to drive the arm 10, there is a time lag from the detection of the intent to the actual driving of the arm 10. In such a case, the user may feel incongruent about the arm 10 not moving immediately even if a finger is attempted to be moved. As a method of improving such a situation, it can be effective to apply a vibration to the hand H of the user by vibration means concurrently with the detection of a myoelectric signal. Vibration means can generate vibrations nearly concurrently with the intent of a user to reduce the feeling of incongruity of the user due to a time lag for driving the arm 10.

In the motion assistive device 100, the arm supporting mechanism 30 may further comprise a first encoder for detecting a rotation angle of the arm 10, and the arm driving means 40 may further comprise a second encoder for detecting a rotation angle of a motor for driving the first and second wires 41 and 42 connected to the arm 10. The motion assistive device 100 can further comprise calculation means (not shown) for calculating tension of the wire portion 40a based on the rotation angle detected by the first encoder and the rotation angle detected by the second encoder.

The tension calculated by the calculation means can be utilized in the motion assistive device 100 to control the motion assistive device 100 in various applications. For example, tension can be used for a torque limiter so that an excessive force would not be applied to a finger of a user. For example, tension can be used so that a user can hold an object with a constant force regardless of the size of the object that is held. For example, tension can be used so that the force of assistance can be adjusted in accordance with the recovery of a user (e.g., patient in rehabilitation). For example, tension can be used to control the motion assistive device 100 so that the movement of the motion assistive device 100 does not interfere with the movement of a user. This can be achieved by, for example, controlling to drive the motion assistive device 100 so as to cancel out the resistance inherent to the motion assistive device 100 due to interference of constituent elements of the motion assistive device 100 with one another, etc., whereby the user can move the hand or fingers as if the motion assistive device 100 is not worn.

Hereinafter, the structures of the arm 10 as well as the base member 31, attachment members 30a and 30b, and pivot axis adjustment mechanism 30c in the arm supporting mechanism 30 are described more specifically.

Figure 8:
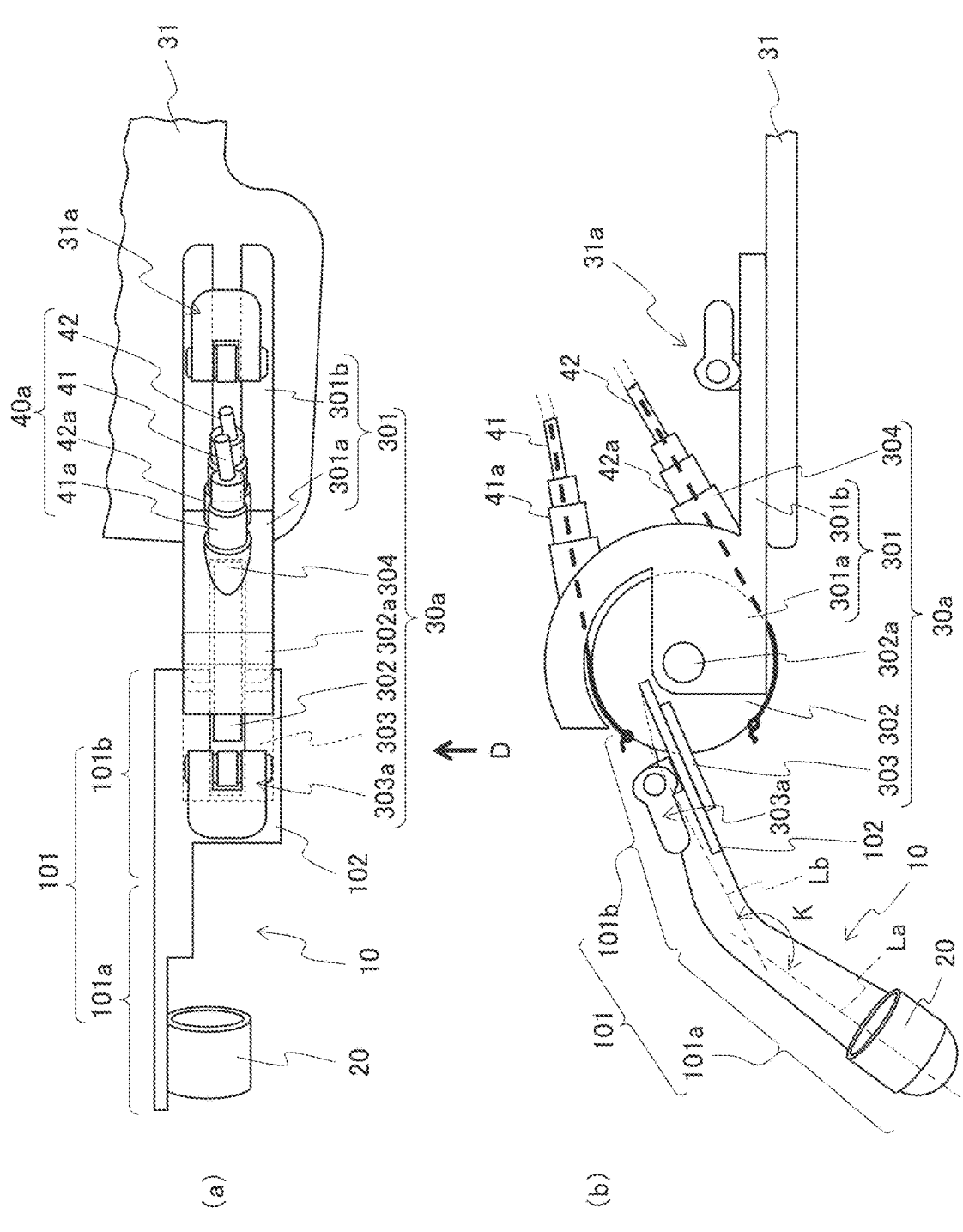
FIG. 8 is a diagram for describing the mechanism for moving the index finger F2 in the motion assistive device
Figure 9:
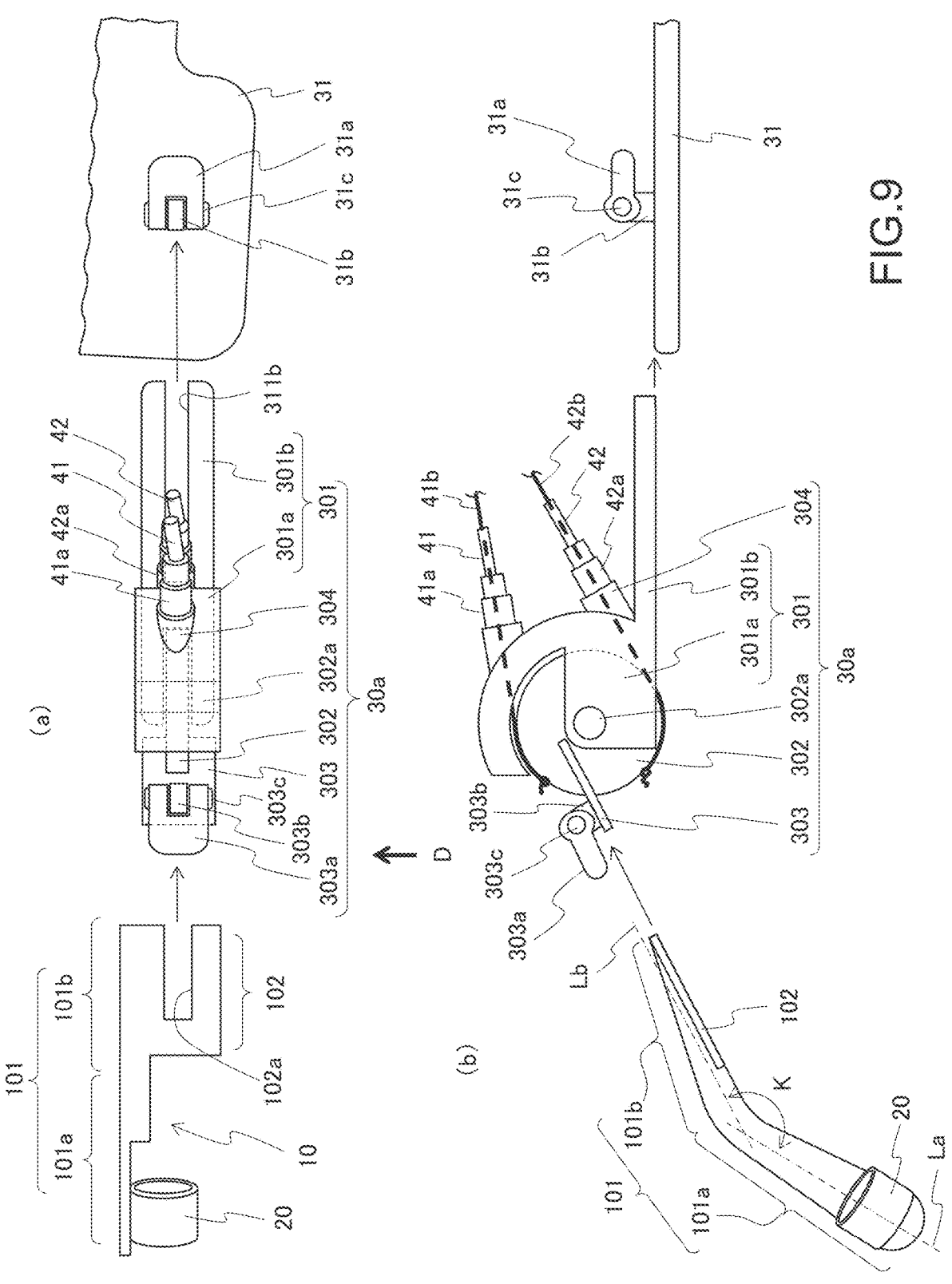
FIG. 9 is a diagram showing the arm 10, attachment member 30*a*, and base member 31 shown in FIG. 8 separated into members.

FIG. 8 is a diagram for describing the mechanism for moving the index finger F2 in the motion assistive device 100 according to embodiment 1 shown in FIG. 6. FIG. 8(a) is a top view showing the base member 31, arm 10, and attachment member 30a viewed from direction A in FIG. 5. FIG. 8(b) is a side view showing the structure of these members viewed from direction D in FIG. 8(a). FIG. 9 is a diagram showing the arm 10, attachment member 30a, and base member 31 shown in FIG. 8 separated into members. FIG. 9(a) is a top view showing these members, and FIG. 9(b) is a side view showing the structure of these members viewed from direction D in FIG. 9(a).

(Arm 10)

The arm 10 comprises an arm body 101 comprised of a tabular member and an arm fixing piece 102, which is a part for fixing the arm 10 to the attachment member 30a, as shown especially in FIG. 9(b). The arm body 101 comprises a first frame piece 101a and a second frame piece 101b. The first frame piece 101a and the second frame piece 101b are joined integrally so that angle K formed by the respective center lines La and Lb is an obtuse angle. The arm body as a whole has a bent shape of a greater-than sign. In this manner, the arm 10 has a structure without a joint between a center of pivot thereof (center of a wheel axis member 302a) and the connective member 20. With such a configuration, a complex mechanism for pivoting an arm would not be required, which enables a simple and light weight structure.

(Connective Member 20)

A belt member is attached, as a connective member 20, to the tip of the first frame piece 101a. The arm 10 can be connected to the index finger F2 by, for example, wrapping the belt member 20 around, and fixing the belt member to, a portion distal to the first joint of a finger (see, for example, the index finger F2 in FIG. 5). Further, the arm fixing piece 102 is formed on the second frame piece 101b, so that the arm fixing piece 102 is configured to be fixed to the attachment member 30a.

(Attachment Member 30a)

The attachment member 30a has an attachment member housing 301, a rotation wheel 302, an arm supporting piece 303, and a fixture attaching portion 304. In this regard, the attachment member housing 301 can comprise an arm supporting portion 301a and a member fixing piece 301b. The arm supporting portion 301a and the member fixing piece 301b may be formed as separate parts or formed integrally. While the constituent material of the attachment member 30a is not particularly limited, resin, metal, ceramic, hard rubber, etc. can be used. The parts may be formed by, for example, resin molding, and may comprise fiber such as reinforcing carbon fiber, metal fiber, or resin fiber inside.

(Arm Supporting Portion 301a of the Attachment Member 30a)

At the arm supporting portion 301a, the rotation wheel 302 for causing an arm to pivot is rotatably supported by the wheel axis member 302a, and the arm supporting piece 303 to which the arm 10 is attached is fixed to the rotation wheel 302. The wheel axis member 302a may be made of resin, or metal from the viewpoint of durability, etc.

To the arm supporting piece 303, an arm fixing lever 303a for detachably fixing the arm fixing piece 102 of the arm 10 is attached. Specifically, a support column 303b is fixed to a tabular member, which is the arm supporting piece 303. The arm fixing lever 303a is pivotably attached to a support pin 303c fixed to the support column 303b, and the base portion is cam shaped. Since the size of the space between the base portion and the tabular member changes by pivoting of the arm fixing lever 303a, the arm fixing piece 102 of the arm 10 can be sandwiched and fixed between the base portion and the tabular member or released from being fixed.

The arm supporting piece 303 and the arm fixing piece 102 can have any form, as long as the relative positions thereof can be adjusted. For example, the top surface of the arm supporting piece 303 (surface contacting the arm fixing piece 102 of the arm 10) is corrugated with a linear convexity and concavity arranged repeatedly at a certain pitch (not shown), and the bottom surface of the arm fixing piece 102 of the arm 10 (surface contacting the arm supporting piece 303 of the attachment member 30a) is also corrugated with a linear convexity and concavity arranged repeatedly at a certain pitch (not shown). With such a configuration, the linear convexity and concavity of the top surface of the arm supporting piece 303 of the attachment member 30a would engage with the linear convexity and concavity of the bottom surface of the arm fixing piece 102 of the arm 10. In this regard, the direction to which the linear convexity and concavity extends is a direction that is parallel to the direction of the rotation axis 302a of the rotation wheel 302, and the direction to which the linear convexity and concavity is arranged is the direction towards which the arm 10 extends (longitudinal direction). A slit 102a along the longitudinal direction of the arm 10 is formed on the arm fixing piece 102, whereby, when the arm fixing piece 102 is inserted between the base portion of the arm fixing lever 303a and the tabular member which is the arm supporting piece 303, the support column 303*b* of the arm supporting piece 303 would be positioned, and move relatively, within the slit 102*a* of the arm fixing piece 102. For this reason, the attachment member 30*a* is configured so that the position of fixing the arm 10 to the attachment member 30*a* can be adjusted stepwise in a unit of a pitch of linear convexity and concavity described above in the longitudinal direction of the finger F (direction towards which the arm 10 extends). Offset in the position of attaching the arm 10 to the attachment member 30*a* can be avoided by engaging the linear convexity and concavity of the arm supporting piece 303 of the attachment member 30*a* with the linear convexity and concavity of the bottom surface of the arm fixing piece 102 of the arm 10 in this manner.

However, the present invention is not limited thereto. The present invention may be configured so that the relative positions of an arm supporting piece and arm fixing piece can be adjusted by using a slide mechanism for relatively sliding the support column 303*b* of the arm supporting piece 303 within the slit 102*a* of the arm fixing piece 102 described above without providing linear convexity and concavity to the arm supporting piece and arm fixing piece.

The arm supporting portion 301*a* further has a pair of fixture attaching portions 304 to which wire fixtures 41*a* and 42*a* are attached. The wire fixtures 41*a* and 42*a* have a structure that enables a pair of the wires 41 and 42 comprising wire core materials 41*b* and 42*b* to be connected. The wire fixtures 41*a* and 42*a* may be made of resin in the same manner as the arm supporting portion 301*a*, or made of metal from the viewpoint of durability, etc.

Holes for allowing the pair of wire core materials 41*b* and 42*b* to pass through are formed on the arm supporting portion 301*a* (not shown). One of the wire core materials, i.e., 41*b*, is bound to an arm 10 side portion of the top half portion of the rotation wheel 302 via the arm supporting portion 301*a*, so that the first wire 41 comprising the wire core material 41*b* is a stretching wire for stretching the finger F. The other wire core material 42*b* is bound to an arm 10 side portion of the bottom half portion of the rotation wheel 302 via the arm supporting portion 301*a*, so that the second wire 42 comprising the wire core material 42*b* is a bending wire 42 for bending the finger F.

(Member Fixing Piece 301*b* of Attachment Member 30*a*)

Meanwhile, the member fixing piece 301*b* can have any form, as long as the position with respect to the base member 31 can be adjusted. For example, the bottom surface (surface contacting the base member 31) of the member fixing piece 301*b* is corrugated with a linear convexity and concavity arranged repeatedly at a certain pitch (not shown) in the same manner as the arm supporting piece 303, as shown in FIG. 9. However, the present invention is not limited thereto. For example, the member fixing piece may be configured so that the position can be adjusted with respect to the base member 31 by comprising a slide mechanism without the bottom surface of the member fixing piece 301*b* being corrugated with a linear convexity and concavity arranged repeatedly at a certain pitch.

(Base Member 31)

An attachment member fixing lever 31*a* for detachably fixing the member fixing piece 301*b* of the attachment member 30*a* is attached to a portion of the base member 31 where the attachment member 30*a* is disposed. Specifically, a support column 31*b* is fixed to a tabular member, which is the base member 31. The attachment member fixing lever 31*a* is pivotably attached to a support pin 31*c* fixed to the support column 31*b* in the same manner as the arm fixing lever 303*a* of the attachment member 30*a*, and the base portion is cam shaped. Since the size of the space between the base portion and the tabular member that is the base member 31 changes by pivoting of the attachment member fixing lever 31*a*, the member fixing piece 301*b* of the attachment member 30*a* can be sandwiched and fixed between the base portion and the base member 31 or released from being fixed.

The base member 31 can have any form, as long as the position with respect to the member fixing piece 301*b* can be adjusted. For example, the top surface of the portion of the base member 31 where the attachment member 30*a* is disposed is corrugated with a linear convexity and concavity arranged repeatedly at a certain pitch (not shown). The base member 31 may be configured so that the linear convexity and concavity formed on the top surface thereof would engage with the convexity and concavity formed on the bottom surface of the member fixing piece 301*b* of the attachment member 30*a*. In this regard, the direction towards which the linear convexity and concavity extends is a direction that is parallel to the direction of the rotation axis of the rotation wheel 302, and the direction to which the linear convexity and concavity is arranged is the direction towards which the arm 10 extends (longitudinal direction). A slit 311*b* along the longitudinal direction of the arm 10 is formed on the member fixing piece 301*b*, whereby, when the member fixing piece 301*b* of the attachment member 30*a* is inserted between the base portion of the attachment member fixing lever 31*a* and the tabular member which is the base member 31, the support column 31*b* of the base member 31 would be positioned, and move relatively, within the slit 311*b* of the member fixing piece 301*b* of the attachment member 30*a*. With such a configuration, the base member 31 is configured so that the position of fixing the attachment member 30*a* to the base member 31 can be adjusted stepwise in a unit of the arranged pitch of linear convexity and concavity in the longitudinal direction of the finger F (direction towards which the arm 10 extends).

Offset in the position of attaching the attachment member 30*a* to the base member 31 can be avoided by engaging the linear convexity and concavity formed on the top surface of the base member 31 with the linear convexity and concavity formed on the bottom surface of the member fixing piece 301*b* of the attachment member 30*a* in this manner. However, the present invention is not limited thereto. For example, the base member may be configured so that the position with respect to the member fixing piece 301*b* can be adjusted by comprising a slide mechanism for sliding the support column 31*b* of the base member 31 within the slit 311*b* of the member fixing piece 301*b* of the attachment member 30*a* described above without providing corrugation with a linear convexity and concavity arranged repeatedly at a certain pitch on the top surface of the base member 31.

(Attachment Member 30*b*)

The arm 10 is pivotably supported by the attachment member 30*b* corresponding to the thumb F1. Furthermore, the attachment member 30*b* is fixed to the base member 31 via the pivot axis adjustment mechanism 30*c*. The pivot axis adjustment mechanism 30*c* adjusts the position and/or orientation of a pivot axis of the arm 10 and is attached adjustably in the direction of width of the hand H to the base member 31.

Figure 10:
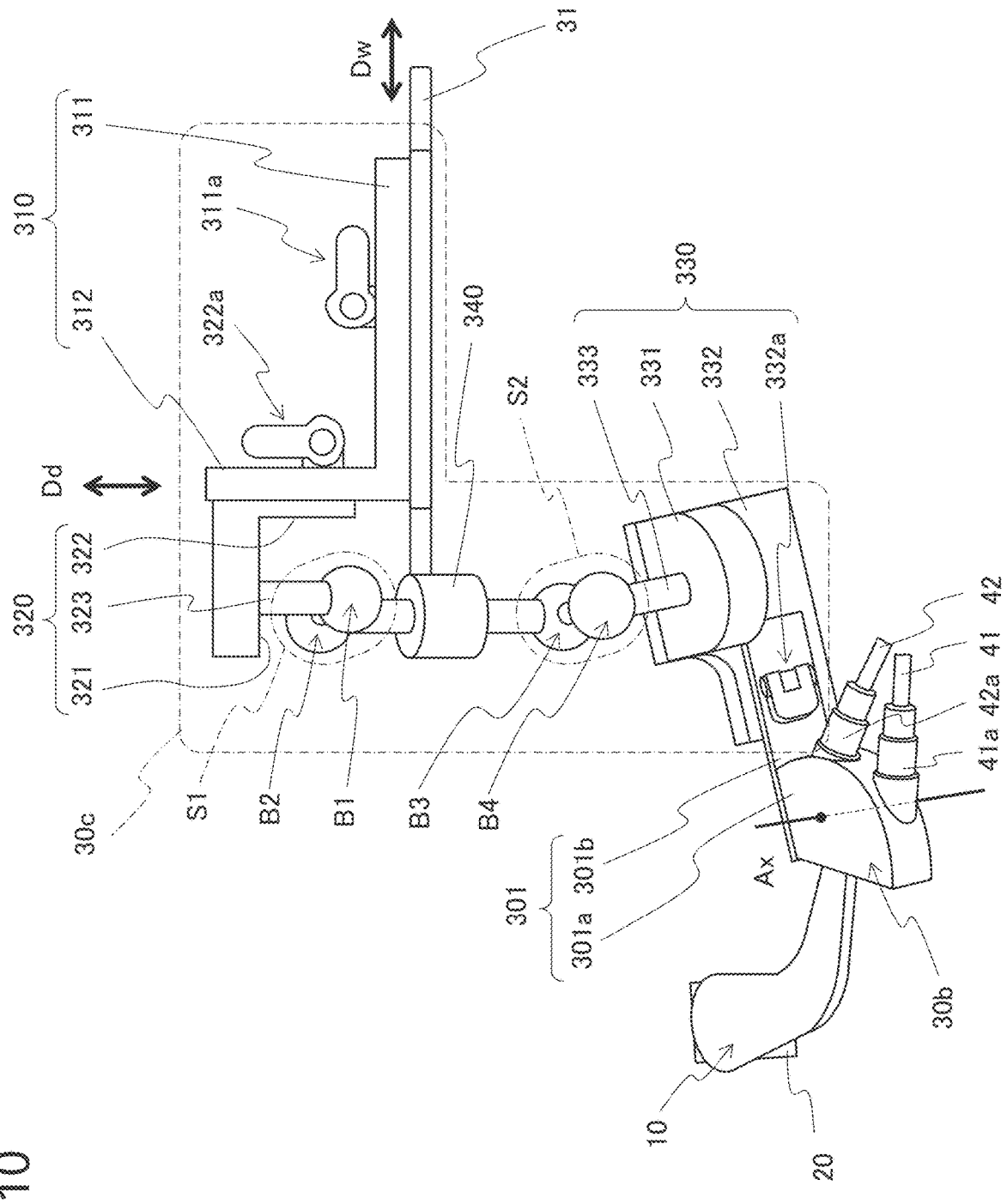
FIG. 10 is a side view for describing pivot axis adjustment mechanism 30*c* in the motion assistive device 100 according to embodiment 1 shown in FIG. 5, which shows the structures of the base member 31 and pivot axis adjustment mechanism 30*c* viewed from direction C in FIG. 5.

FIG. 10 is a side view for describing the pivot axis adjustment mechanism 30*c* in the motion assistive device 100 according to embodiment 1 shown in FIGS. 5 to 7, which shows the structure of the base member 31 and pivot axis adjustment mechanism 30*c* viewed from direction C in FIG. 5. However, the posture of a third bracket 330 with respect to a second bracket 320 is described differently in FIG. 10 from FIGS. 5 to 7 for convenience of description.

The pivot axis adjustment mechanism 30c has a first bracket 310 fixed to the base member 31 so that the position can be adjusted in the direction of width Wh of the hand H, a second bracket 320 fixed to the first bracket 310 so that the position can be adjusted in the direction of height on the base member 31, and a third bracket 330 for fixing the position of the attachment member 30b corresponding to the thumb F1 adjustably in a direction towards which the arm 10 extends.

The base member 31 has a structure that can fix the first bracket 310 to the base member 31 by a bottom surface side fixing lever 311a, in the same manner the base member 31 is fixed to the member fixing piece 301b of the attachment member 30a. Furthermore, the second bracket 320 has a structure that can fix the second bracket 320 to the first bracket 310 by a side surface side fixing lever 322a. Furthermore, the second bracket 320 and the third bracket 330 are connected via four ball joints B1, B2, B3, and B4.

Specifically, the first bracket 310 is an L-shaped angled member with a bottom surface portion 311 and a side surface portion 312. The bottom surface side fixing lever 311a for detachably fixing the bottom surface portion 311 of the first bracket 310 is attached to a portion of the base member 31 where the bottom surface portion 311 of the first bracket 310 is disposed. The bottom surface side fixing lever 311a is pivotably attached via a support column (not shown) fixed to a tabular member which is the base member 31 in the same manner as the attachment member fixing lever 31a, and the base portion is cam shaped. Since the size of the space between the base portion and the tabular member that is the base member 31 changes by pivoting of the bottom surface side fixing lever 311a, the bottom surface portion 311 of the first bracket 310 can be sandwiched and fixed between the base portion and the base member 31 or released from being fixed.

Furthermore, the top surface of a portion of the base member 31 where the bottom surface portion 311 of the first bracket 310 is disposed is corrugated with a linear convexity and concavity arranged repeatedly at a certain pitch. The base member 31 is configured so that the convexity and concavity formed on the top surface thereof would engage with the convexity and concavity formed on the bottom surface of the bottom surface portion 311 of the first bracket 310. In this regard, the direction to which the linear convexity and concavity extends is the direction Wh that is parallel to the direction of width of the hand H, and the direction to which the linear convexity and concavity is arranged is the direction towards which the arm 10 extends (longitudinal direction). For this reason, the base member 31 is configured so that the position of fixing the first bracket 310 to the base member 31 can be adjusted stepwise in a unit of the arranged pitch of linear convexity and concavity in the direction of width of the hand H. However, the present invention is not limited thereto. For example, the base member may be configured so that the position of the first bracket 310 with respect to the base member 31 can be adjusted by comprising a slide mechanism similar to the slide mechanism for the base member 31 and the attachment member 30a without providing corrugation with a linear convexity and concavity arranged repeatedly at a certain pitch on the top surface of a portion of the base member 31 where the bottom surface portion 311 of the first bracket 310 is disposed.

The second bracket 320 is an L-shaped angled member with a top surface portion 321 and a side surface portion 322.

A side surface side fixing lever 322a for detachably fixing the side surface portion 312 of the first bracket 310 is attached to the side surface portion 322 of the second bracket 320. The side surface side fixing lever 322a is pivotably attached to a support column (not shown) fixed to the side surface portion 322 of the second bracket 320, and the base portion is cam shaped. Since the size of the space between the base portion and the side surface portion 322 changes by pivoting of the side surface side fixing lever 322a, the side surface portion 312 of the first bracket 310 is sandwiched between the base portion and the side surface portion 322, so that the second bracket 320 can be fixed or released from being fixed to the first bracket 310.

Furthermore, the surface of a portion of the side surface portion 312 of the first bracket 310 where the side surface portion 322 of the second bracket 320 is disposed is corrugated with a linear convexity and concavity arranged repeatedly at a certain pitch. The side surface portion 322 of the second bracket 320 is configured so that the convexity and concavity formed on the surface thereof would engage with the convexity and concavity formed on the surface of the side surface portion 312 of the first bracket 310. In this regard, the direction to which the linear convexity and concavity extends is the direction that is orthogonal to a direction that is parallel to the direction of width of the hand H, and the direction to which the linear convexity and concavity is arranged is the direction of height on the back of the hand. For this reason, the second bracket 320 is configured so that the position of fixing the second bracket to the first bracket 310 can be adjusted stepwise in a unit of the arranged pitch of convexity and concavity in the direction of height of the side surface portion 312 of the first bracket 310. However, the present invention is not limited thereto. For example, it may be configured so that the position of the second bracket 320 with respect to the first bracket 310 can be adjusted by comprising a slide mechanism similar to the slide mechanism for the base member 31 and the attachment member 30a without providing corrugation with a linear convexity and concavity arranged repeatedly at a certain pitch on the surface of the portion of the side surface portion 312 of the first bracket 310 where the side surface portion 322 of the second bracket 320 is disposed.

Furthermore, the second bracket 320 and the third bracket 330 are connected by four ball joints B1 to B4. The connection structure using the ball joints B1 to B4 is described hereinafter.

Figure 11:
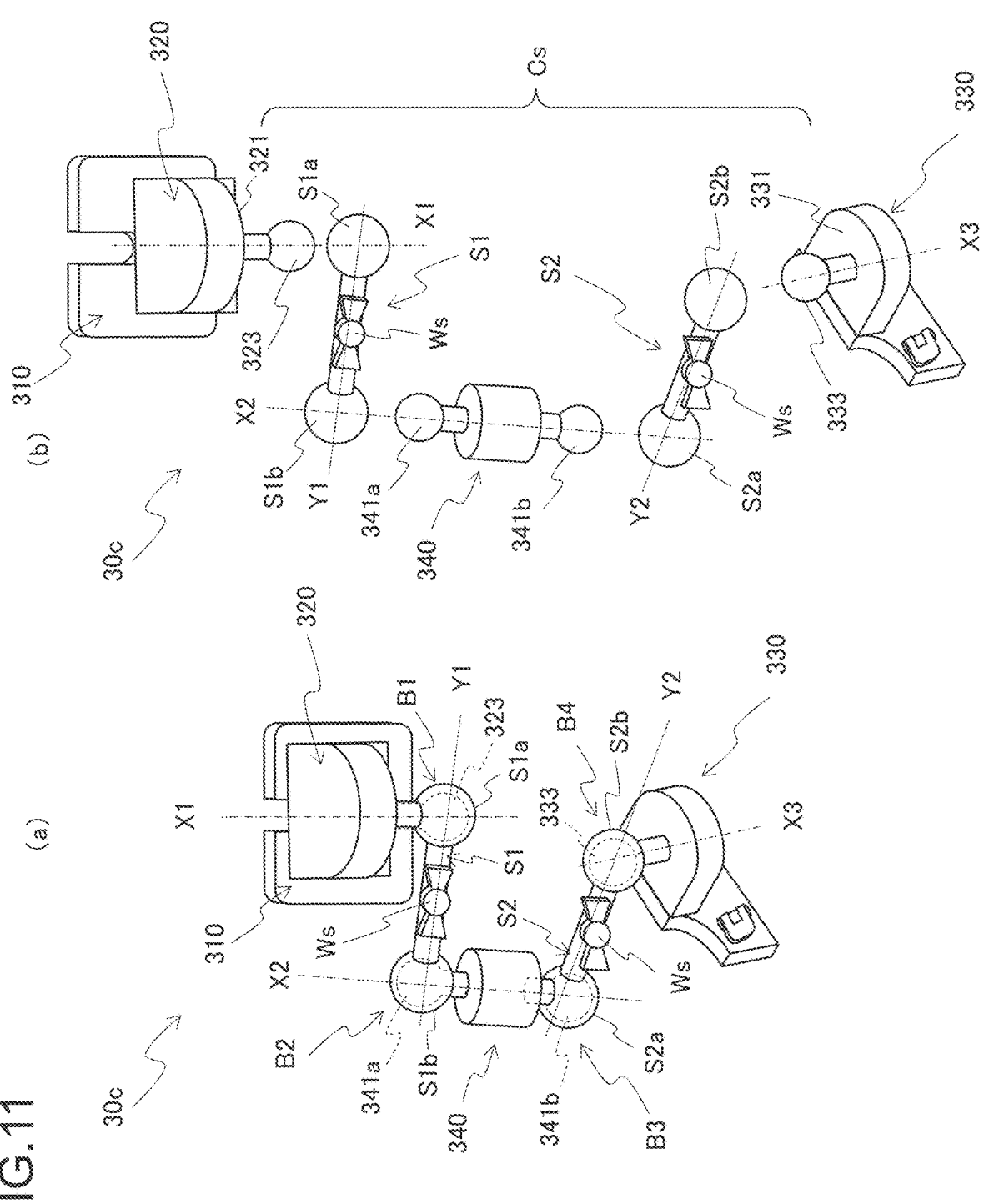
FIG. 11 is a diagram for specifically describing the pivot axis adjustment mechanism 30*c* shown in FIG. 5.

FIG. 11 is a diagram for specifically describing the pivot axis adjustment mechanism 30c shown in FIG. 5. FIG. 11(a) is a perspective view of the pivot axis adjustment mechanism 30c viewed from the same angle as FIG. 5. FIG. 11(b) shows the pivot axis adjustment mechanism 30c shown in FIG. 11(a) decomposed into parts.

As shown in FIG. 11(a), the second bracket 320 is connected to the third bracket 330 through a connection structure Cs using the four ball joints B1 to B4 in the pivot axis adjustment mechanism 30c.

As shown in FIG. 11(b), the connection structure Cs comprises a spherical column 323 attached to the top surface portion 321 of the second bracket 320, a first spherical socket member S1, a coupling column 340, a second spherical socket member S2, and a spherical column 333 attached to a top surface portion 331 of the third bracket 330.

In this regard, the coupling column 340 has a cylindrical base 340 and spherical columns 341a and 341b attached to the respective ends of the base 340a.

The first spherical socket member S1 has a pair of left and right spherical sockets Sla and Sib and is configured to retain the spherical column 323 of the second bracket 320 within one of the spherical sockets, i.e., Sla, and retain the spherical column 341a of the coupling column 340 within the other spherical socket S1b.

The second spherical socket member S2 has a pair of left and right spherical sockets S2a and S2b and is configured to retain the other spherical column 341b of the coupling column 340 within one of the spherical sockets, i.e., S2a, and retain the spherical column 333 of the third bracket 330 within the other spherical socket S2b.

In this regard, a central axis X1 of the spherical column 323 of the second bracket 320 and a central axis Y1 of the first spherical socket member S1 intersect at the center of the first ball joint B1. The central axis Y1 of the first spherical socket member S1 and a central axis X2 of the coupling column 340 intersect at the center of the second ball joint B2. Furthermore, the central axis X2 of the coupling column 340 and a central axis Y2 of the second spherical socket member S2 intersect at the center of the third ball joint B3. The central axis Y2 of the second spherical socket member S2 and a central axis X3 of the spherical column 333 of the third bracket 330 intersect at the center of the fourth ball joint B4.

By connecting the second bracket 320 and the third bracket 330 with the ball joints B1, B2, B3, and B4 in this manner, the posture of two members connected by each ball joint can be set in any posture, and the third bracket 330 can be fixed to face any direction with respect to the second bracket 320.

Figure 12:
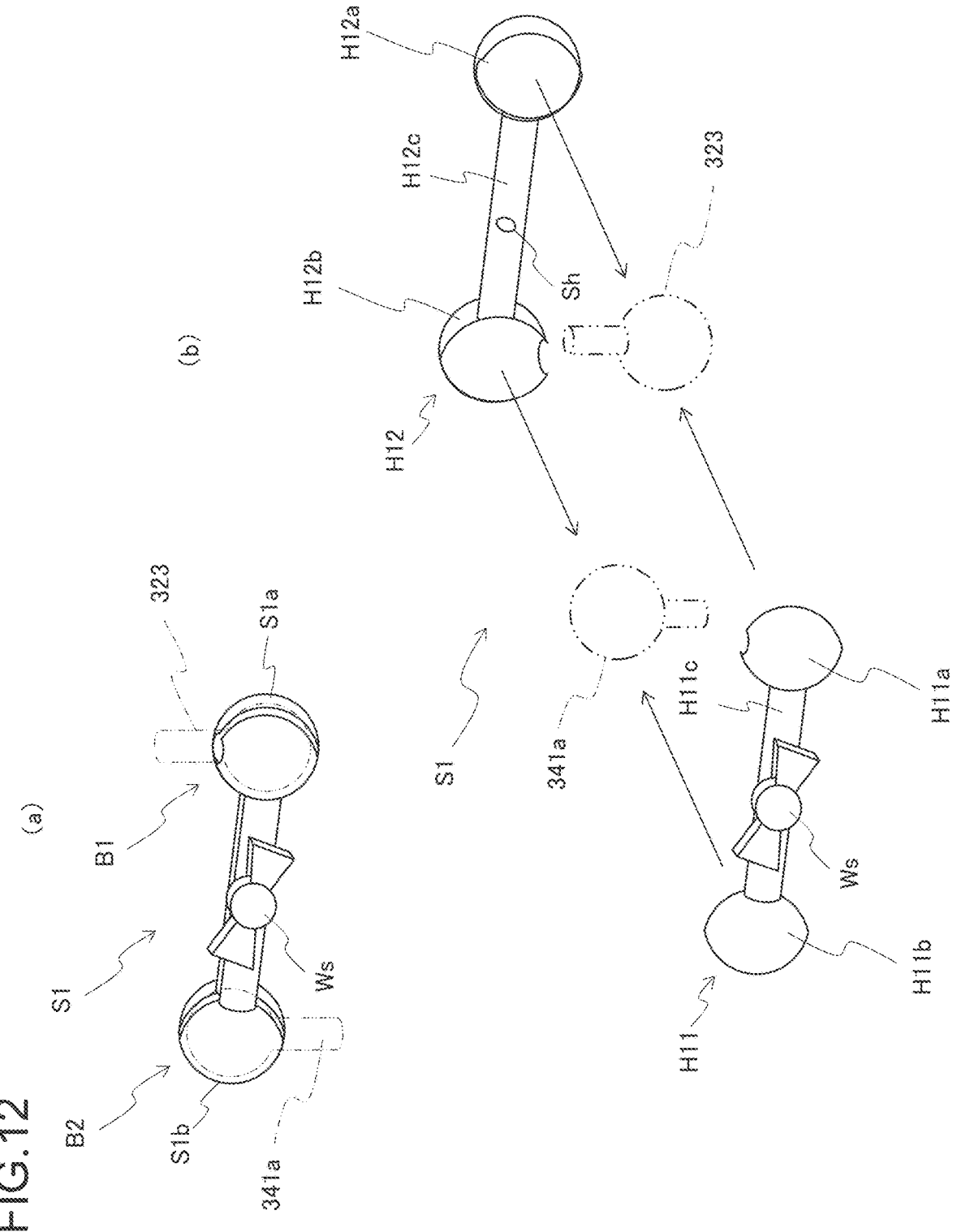
FIG. 12 is a diagram for describing a structure connecting spherical columns 323 and 341*a* constituting ball joints B1 and B2 shown in FIG. 11 with first spherical socket member S1.

FIG. 12 is a diagram for describing the structure of connection between the spherical columns 323 and 341a constituting the ball joints B1 and B2 and the first spherical socket member S1 shown in FIG. 11. FIG. 12(a) shows the ball joints B1 and B2 in an assembled state, and FIG. 12(b) shows the ball joints B1 and B2 in a decomposed state.

In this regard, the first spherical socket member S1 and the second spherical socket member S2 have the same configuration. Thus, the structure of the first spherical socket member S1 is described.

The first spherical socket member S1 is comprised of a pair of shell members H11 and H12. One of the shell members, i.e., H11, comprises a pair of semispherical members H11a and H11b and a semi-cylindrical member H11c that links the pair of semispherical members H11a and H11b. Likewise, the other shell member H12 comprises a pair of semispherical members H12a and H12b and a semi-cylindrical member H12c that links the pair of semispherical members H12a and H12b.

The first spherical socket member S1 has a wing nut member Ws attached to the semi-cylindrical member H11c of one of the shell members, i.e., H11, and a screw hole Sh for screwing on the wind nut member Ws is formed on the semi-cylindrical member H12c of the other shell member H12.

If the pair of shell members H11 and H12 are jointed with the wing nut member Ws so that the spherical columns 323 and 341a are retained by the corresponding left and right semi-spherical members H11a and H11b of one of the shell members, i.e., H11, and the left and right semi-spherical members H12a and H12b of the other shell member H12 in the first spherical socket member S1 with such a configuration, one of the semi-spherical members, i.e., H11a, of one of the shell members, i.e., H11, and one of the semi-spherical members, i.e., H12a, of the other shell member H12 form one of the spherical sockets, i.e., Sla, of the first spherical socket member S1 that holds the spherical column 323 of the second bracket 320, and the other semi-spherical member H11b of one of the shell members, i.e., H11, and the other semi-spherical member H12b of the other shell member H12 form the other spherical socket Sla of the first spherical socket member S1 that holds the spherical column 341a of the coupling column 340, whereby the ball joints B1 and B2 are formed.

The movement is now described.

First, a method of mounting the motion assistive device 100 according to embodiment 1 shown in FIG. 5 on the hand H of a user is described using FIGS. 5, 8, 9, and 15.

A user initially attaches the base member 31 of the motion assistive device 100 to the hand H for which assistance is to be provided for the bending/stretching motion of the finger F. The base member 31 is attached by placing the base member 31 on the back Hb of the hand H, and fixing the base member 31 to the hand H by using two fixing members connected to the base member 31, i.e., the back hand side fixing member 32a and the bottom surface side fixing lever 311a. At this time, the position and/or orientation of the base member 31 with respect to the back of the hand Hb can be adjusted in accordance with the size and/or shape of the hand of the user as shown in FIG. 15.

The position of the attachment member 30a corresponding to the finger F other than the thumb F1 is adjusted with respect to the base member 31 in accordance with the size of the hand H of the user.

If the attachment member 30a is already attached to the base member 31, the attachment member fixing lever 31a is loosened, and the position of the attachment member 30a with respect to the base member 31 is adjusted in accordance with the size of the hand of the user, and the attachment member fixing lever 31a is re-tightened. At this time, the position of the attachment member 30a is adjusted so that the position of the wheel axis member 302a of the rotation wheel 302 of the attachment member 30a (i.e., center of pivot of the arm 10) is positioned on the MP joint (third joint) or towards a wrist side relative to the MP joint of the finger F. Disposing the pivot axis on the MP joint (joint at the base of the finger F) or towards a wrist side relative to the MP joint of the finger F enables all joints, i.e., MP joint, PIP joint, and DIP joint, to bend at a constant ratio in response to bending/stretching of a finger. As a result, a "pinching" motion can be smoothly performed.

If the attachment member 30a is not mounted on the base member 31, the member fixing piece 301b of the attachment member 30a is inserted between the base member 31 and the attachment member fixing lever 31a and the positions of the members are aligned, then the attachment member fixing lever 31a is tightened to fix the attachment member 30a to the base member 31 as shown in FIGS. 8 and 9.

In this regard, the positions of the attachment members 30a corresponding to each of the index finger F2, middle finger F3, ring finger F4, and pinky finger F5 are adjusted.

The position of the arm 10 is then adjusted. If the arm 10 is already mounted on the attachment member 30a, the arm fixing lever 303a of the attachment member 30a is loosened, and the position of the arm 10 with respect to the attachment member 30a is adjusted in accordance with the length of the finger F of the user.

If the arm 10 is not mounted on the attachment member 30a, the arm fixing piece 102 of the arm 10 is inserted between the arm supporting piece 303 and the arm fixing lever 303a of the attachment member 30a and the positions of the arm and attachment member are aligned, then the arm fixing lever 303*a* is tightened to fix the arm 10 to the attachment member 30*a*.

The position and orientation of the attachment member 30*b* corresponding to the thumb F1 are adjusted with respect to the base member 31 in accordance with the size or shape of the hand H of the user. The adjustment procedure is described using FIGS. 5 and 10.

The attachment member 30*b* corresponding to the thumb F1 is not directly attached to the base member 31, but through the pivot axis adjustment mechanism 30*c*. Thus, the pivot axis adjustment mechanism 30*c* is first attached to the base member 31. When the attachment member 30*b* is mounted on the pivot axis adjustment mechanism 30*c*, the pivot axis adjustment mechanism 30*c* may or may not be mounted on the base member 31, but it is presumed in this embodiment that the pivot axis adjustment mechanism 30*c* is already mounted on the base member 31 when the attachment member 30*b* is mounted on the pivot axis adjustment mechanism 30*c*.

First, the member fixing piece 301*b* of the attachment member 30*b* is inserted between the side surface portion 332 of the third bracket 330 and the member fixing lever 332*a* of the pivot axis adjustment mechanism 30*c*, and the positions are roughly aligned. The member fixing lever 332*a* is then tightened to mount the attachment member 30*b* on the third bracket 330.

In this state, the position in the direction of width Dw of the hand and the position in the direction of thickness Dd of the hand of the attachment member 30*b* are adjusted using the first bracket 310 and the second bracket 320.

Specifically, the bottom surface side fixing lever 311*a* of the base member 31 is loosened, and the first bracket 310 is moved in the direction of width Dw of the hand relative to the base member 31 to adjust the position thereof, then the bottom surface side fixing lever 311*a* is tightened to fix the first bracket 310 to the base member 31 (see FIG. 10).

Subsequently, the side surface side fixing lever 322*a* of the second bracket 320 is loosened, and the second bracket 320 is moved in the direction of thickness Dd of the hand relative to the first bracket 310 to adjust the position thereof, then the side surface side fixing lever 322*a* is tightened to fix the second bracket 320 to the first bracket 310 (see FIG. 10).

Furthermore, the posture (orientation) and distance of the third bracket 330 with respect to the second bracket 320 are adjusted.

The adjustment procedure is described using FIG. 11(*a*).

First, the wing nut member Ws of the first spherical socket member S1 is adjusted to be tightened loosely, whereby the strength of fixing with the ball joints B1 and B2 is weakened to allow the posture of the coupling column 340 with respect to the second bracket 320 to be adjusted.

Specifically, one of the spherical sockets, i.e., S1*a*, of the first spherical socket member S1 is rotated with respect to the spherical column 323 of the second bracket 320 to adjust the positional relationship thereof. In such a case, the angle formed between the central axis X1 of the spherical column 323 and the central axis Y1 of the first spherical socket member S1 is three-dimensionally adjusted.

Furthermore, the other spherical socket S1*b* of the first spherical socket member S1 is rotated with respect to the spherical column 341*a* of the coupling column 340 to adjust the positional relationship thereof. In such a case, the angle formed between the central axis X2 of the coupling column 340 and the central axis Y1 of the first spherical socket member S1 is three-dimensionally adjusted.

The wing nut member Ws of the first spherical socket member S1 is then tightened firmly to fix the posture of the coupling column 340 with respect to the second bracket 320.

Likewise, the wing nut member Ws of the second spherical socket member S2 is then adjusted to be tightened loosely so that the strength of fixing with the ball joints B3 and B4 is weakened to adjust the posture of the third bracket 330 with respect to the coupling column 340. In such a case, the angle formed between the central axis X2 of the coupling column 340 and the central axis Y2 of the second spherical socket member S2 is three-dimensionally adjusted, and the angle formed between the central axis Y2 of the second spherical socket member S2 and the central axis X3 of the spherical column 333 of the third bracket 330 is three-dimensionally adjusted.

In this manner, the posture (orientation) and distance of the third bracket 330 with respect to the second bracket 320 are adjusted.

The attachment member 30*b* is then attached to the third bracket 330. The structure of attaching the attachment member 30*b* to the third bracket 330 is the same as the structure of attaching the attachment member 30*a* to the base member 31.

Specifically, the member fixing piece 301*b* of the attachment member 30*b* is inserted between the side surface portion 332 of the third bracket 330 and the member fixing lever 332*a* and the positions of the attachment member and the third bracket are aligned, then the member fixing lever 332*a* is tightened to fix the attachment member 30*b* to the third bracket 330 (see FIG. 10).

A method of mounting the motion assistive device 100 on the hand of a user is not limited to the method described above. The members can be positioned in any manner and assembled in any order.

When the motion assistive device 100 is mounted on the hand in this manner and then the power switch (not shown) is turned on, a sensor for detecting a myoelectric signal is actuated, and the wire driving unit 40*b* enters a standby mode.

When a user attempts to move the finger F in this state, a myoelectric signal is generated. If a sensor detects such a myoelectric signal in the motion assistive device 100, a controller controls the wire driving unit 40*b* based on the myoelectric signal detected by the sensor.

Specifically, when a user attempts to, for example, grab an object such as a pencil with the index finger F2 and the thumb F1, the wire driving unit 40*b* drives the second wire 42 connected to the attachment members 30*a* and 30*b* of the arms 10 connected to the index finger F2 and the arm 10 connected to the thumb F1 so that the respective arms pivot in response to a control signal from a controller, whereby the wire core material 42*b* of the second wire 42 is pulled, so that the rotation wheel 302 in each of the attachment members 30*a* and 30*b* rotates, and the arms 10 connected to the index finger F2 and the thumb F1 pivot in the direction to bend the index finger F2 and the thumb F1.

At this time, the index finger F2 and the thumb F1 move on circumferences L1 and L2 centered at the centers of pivot Cr1 and Cr2 of the arms 10, respectively.

Specifically, the motion assistive device 100 according to embodiment 1 can move the finger F with such a simple configuration that causes each arm to pivot about its center of pivot.

Since the connective member 20 maintains a constant distance with respect to the center of pivot during pivoting of an arm, the trajectory of the fingertip would be unique in bending/stretching motions of a finger by a user, whereby the finger F can be moved repeatedly on the same trajectory with precision. As a result, the tips of each of the index finger F2 and the thumb F1 can precisely grab a pencil that is the object of interest.

When a user attempts to release a pencil, a myoelectric signal corresponding to the intent is generated. When this is detected by a sensor, a controller receives a detected signal from the sensor and controls the wire driving unit 40b, whereby the wire driving unit 40b drives the first wire 41 connected to the attachment members 30a and 30b of the arm 10 connected to the index finger F2 and the arm 10 connected to the thumb F1 so that the arms pivot in a direction towards which the index finger F2 and the thumb F1 are stretched, respectively, whereby the wire core material 41a of the first wire 41 is pulled, so that the rotation wheel 302 in each of the attachment members 30a and 30b rotates in reverse, and the arms 10 connected to the index finger F2 and the thumb F1 pivot in the direction to stretch the index finger F2 and the thumb F1.

In the motion assistive device 100 according to embodiment 1, a portion distal to the first joint of the finger F is connected to the tip of the arm 10, the base portion of the arm 10 is pivotably supported by the arm supporting mechanism 30, and a myoelectric signal of a user is detected to drive the arm 10 by the arm driving means 40 in this manner. Thus, a mechanism for causing a finger to pivot can be materialized with an arm without a joint that is pivotably supported, and a finger can be moved with a simple mechanism without a complex link mechanism.

Since the connective member 20 maintains a constant distance with respect to the center of pivot during pivoting of the arm 10, the trajectory of the fingertip would be unique in bending/stretching motions of a finger by a user, whereby the finger F can be moved repeatedly on the same trajectory with precision.

Further, the orientation of a pivot axis of the arm 10 can be matched to the position or orientation of a finger, which is different for each person, by comprising the pivot axis adjustment mechanism 30c that is capable of adjusting the position and/or orientation of the pivot axis of an arm.

Further, a device is configured to cause the arm 10 to pivot by connecting one end of a pair or wires (first wire 41 and second wire 42) to the arm 10, connecting the other end of the pair of wires to the wire driving unit 40b provided external to the body of a user, detecting a myoelectric signal that is generated when a user attempts to move a finger, and driving the wires by the wire driving unit 40b. Thus, the burden on the user from mounting the motion assistive device 100 on the hand H of the user can be alleviated.

Since the motion assistive device 100 comprises a vibration generator that generates vibrations when a sensor detects a myoelectric signal, the feeling of incongruity due to a time lag from the detection of a myoelectric signal by a sensor to movement of the finger F by driving the arm 10 can be reduced.

Since the tension on a wire can be calculated without a force sensor, the motion assistive device 100 can have a simple mechanism. Furthermore, the motion assistive device 1 can be controlled in various applications by utilizing the calculated tension.

Embodiment 2

Figure 16:
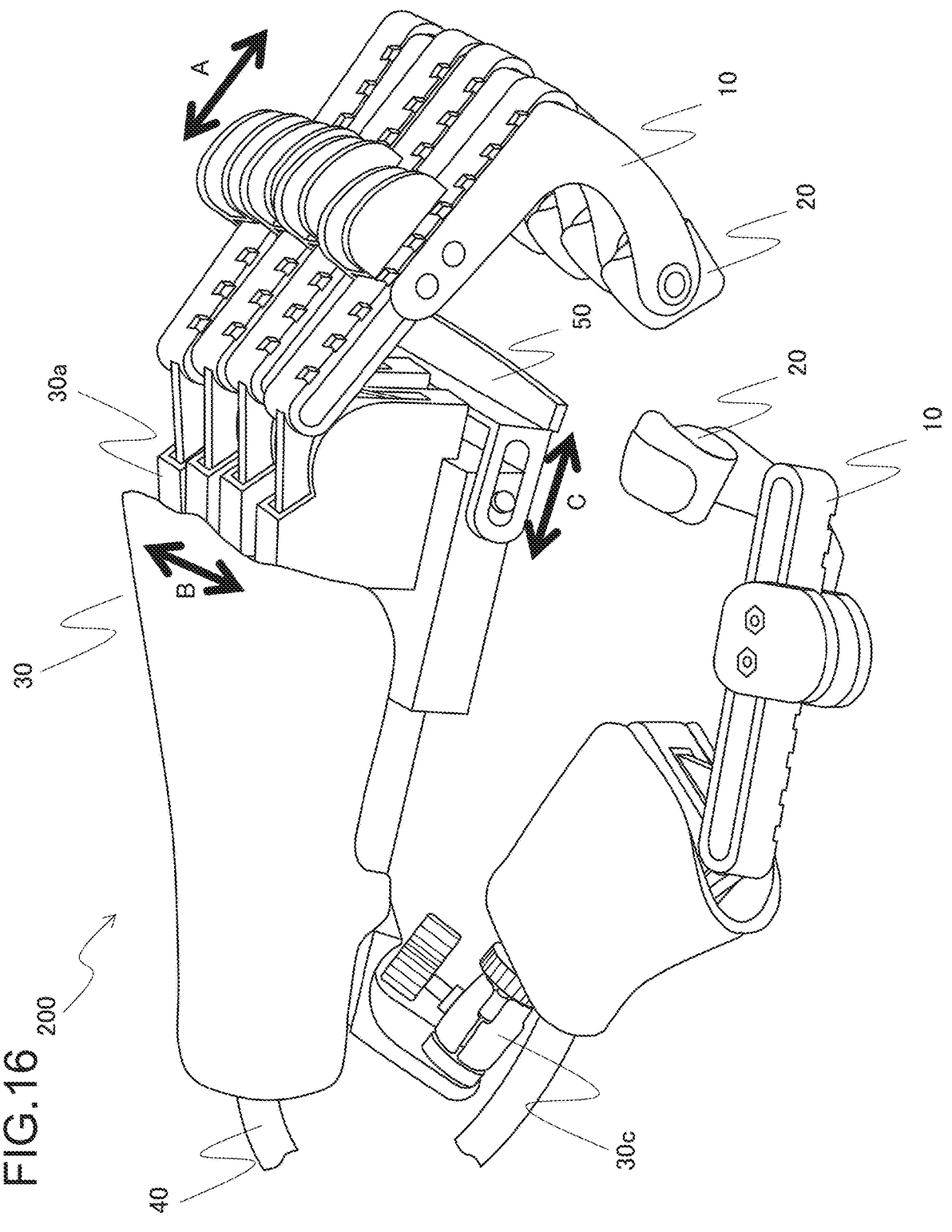
FIG. 16 is a perspective view for describing motion assistive device 200 according to embodiment 2 of the invention.

FIG. 16 is a perspective view for describing a motion assistive device 200 according to embodiment 2 of the invention. The motion assistive device 200 can have the same configuration as the motion assistive device 100, except for comprising a stopper 50. Thus, the above descriptions associated with the motion assistive device 100 are also applicable to the motion assistive device 200. Therefore, the same reference numbers are assigned to the constituent elements that are the same as the constituent elements described above for the motion assistive device 100, and the descriptions thereof can be omitted.

In the example shown in FIG. 16, the base member 31 and the fixing member 32 of the arm supporting mechanism 30 are omitted. Instead, the attachment member 30a of the arm supporting mechanism 30 and a housing body covering the same are shown. The attachment member 30a and a housing body covering the same can be attached to, for example, the base member 31 shown in FIG. 15.

The motion assistive device 200 comprises the arm 10, the connective member 20 for connecting a finger to the arm 10, the arm supporting mechanism 30 for pivotably supporting the arm 10, the arm driving means 40 for causing the arm 10 to pivot, and the stopper 50, wherein the arm 10 is configured to pivot while maintaining a constant distance between the connective member 20 and the center of pivot of the arm 10.

The stopper 50 is configured to extend from the arm supporting mechanism 30 and to be able to restrict movement of a proximal phalanx of the finger of the user by abutting the proximal phalanx. For example, the stopper 50 extends from the tip of the arm supporting mechanism 30 towards the anterior side (i.e., side to which the arm 10 extends from the arm supporting mechanism 30). The stopper 50 is configured to be able to extend substantially parallel to the back of the hand of a user when the motion assistive device 200 is mounted on the back of the hand. In other words, the stopper 50 can extend to the anterior side of the arm supporting mechanism 30 substantially parallel to the flat surface of the base member 31 (flat surface substantially parallel to the back of the hand).

In the example shown in FIG. 16, the arm 10 has a substantially L shape, whereby interference of the arm 10 by the stopper 50 is avoided. Means for avoiding interference of the arm 10 by the stopper 50 is not limited thereto. For example, interference of the arm 10 by the stopper 50 can be avoided by configuring the arm 10 to have a shape other than a substantially L-shape (e.g., curved shape or substantially J-shape). For example, interference of the arm 10 by the stopper 50 can be avoided by configuring the stopper 50 to have a plurality of separate structures for each finger instead of a structure that is continuous in the direction traversing the hand. For example, interference of the arm 10 by the stopper 50 can be avoided by providing a slit through which the arm 10 can pass on the stopper 50.

The example shown in FIG. 16 is configured so that arrangement of each constituent element of the motion assistive device 200 can be adjusted.

For example, the arm 10 is configured so that the length thereof can be adjusted in directions A in FIG. 16, whereby the length of the arm 10 can be adjusted in accordance with the length of a finger of a hand of a user.

For example, a plurality of the attachment members 30a is configured so that the space therebetween can be adjusted in directions B in FIG. 16, whereby the spaces between a plurality of arms 10 can be adjusted in accordance with the space between the fingers of a user.

For example, the stopper 50 is configured so that the degree of extension thereof can be adjusted in directions C in FIG. 16, whereby the degree of extension of the stopper from the arm supporting mechanism 30 can be adjusted in accordance with the length of the proximal phalanx of a hand of a user.

In the example shown in FIG. 16, the pivot axis adjustment mechanism 30c is comprised of one ball joint, whereby the size and weight of the motion assistive device 200 can be reduced.

As disclosed above, the present invention is exemplified by the use of its preferred embodiments. However, the present invention should not be interpreted to be limited to such embodiments. It is understood that the scope of the present invention should be interpreted based solely on the claims. It is understood that an equivalent scope can be practiced by those skilled in the art based on the descriptions of the present invention and common general knowledge from the specific descriptions of the preferred embodiments of the invention. It is also understood that any document cited herein should be incorporated herein by reference in the same manner as the contents are specifically described herein.

INDUSTRIAL APPLICABILITY

The present invention is useful as an invention that can provide a motion assistive device, which has a mechanism for moving a finger of a hand that is simple and light weight with low burden on the users.

REFERENCE SIGNS LIST

10 arm
20 connective member
30 arm supporting mechanism
30a, 30b attachment member
30c pivot axis adjustment mechanism
31 base member
40 arm driving means
50 stopper
100, 200 motion assistive device
F finger
H hand

The invention claimed is:

1. A motion assistive device for assisting bending/stretching of fingers of a user, comprising:
at least one arm;
at least one connective member configured to be able to connect the at least one arm to the respective fingers, the at least one connective member being rotatably attached to the at least one arm;
a base member that can be mounted on a back of a hand of the user;
at least one attachment member for pivotably supporting the at least one arm on the base member; and
a motor and/or at least one wire for causing the at least one arm to pivot;
wherein the at least one arm is configured to pivot about a center of pivot while maintaining a constant distance between the at least one connective member and the center of pivot of the at least one arm;
wherein the at least one arm has a shape that is bent in a direction of enveloping a hand side;
wherein the base member and the at least one attachment member are configured so that the center of pivot of the at least one arm is disposed above an MP joint or towards a wrist side relative to the MP joint of the fingers; and wherein the at least one connective member is configured to connect the at least one arm between a DIP joint and a PIP joint, to a DIP joint, or to a portion distal to a DIP joint of the fingers.

2. The motion assistive device of claim 1, wherein the base member and the at least one attachment member are configured so that a position and/or orientation of the base member with respect to the back of the hand can be adjusted.

3. The motion assistive device of claim 1, wherein the at least one attachment member is configured so that a position where the at least one arm is fixed to the at least one attachment member can be adjusted in a longitudinal direction of the fingers.

4. The motion assistive device of claim 1, further comprising:
at least one ball joint for adjusting a position and/or orientation of the center of pivot of the at least one arm.

5. The motion assistive device of claim 1, wherein the at least one connective member is configured to connect the at least one arm to the fingers such that a tip of the fingers is exposed.

6. The motion assistive device of claim 1, wherein the at least one connective member is made of a first material having a first rigidity and a second material having a second rigidity that is greater than the first rigidity.

7. The motion assistive device of claim 1, wherein the at least one arm is configured to have a structure without a joint between the center of pivot and the connective member.

8. The motion assistive device of claim 1, wherein the motion assistive device further comprises:
a sensor for detecting a myoelectric signal that is generated when the user attempts to move a finger; and
vibration generator that generates vibrations when the sensor has detected the myoelectric signal.

9. The motion assistive device of claim 8, wherein the motion assistive device comprises the at least one wire and the motor, wherein the at least one wire is connected to the respective at least one arm, and the motor is connected to the at least one wire, and wherein the motion assistive device further comprises:
a first encoder for detecting a rotation angle of the at least one arm,
and
a second encoder for detecting a rotation angle of the motor,
wherein the motion assistive device is configured to calculate tension of the at least one wire based on the rotation angle detected by the first encoder and the rotation angle detected by the second encoder.

10. The motion assistive device of claim 9, wherein the at least one wire and the motor are configured to drive the at least one arm so as not to interfere with a movement of the fingers of the user based on the calculated tension.

11. The motion assistive device of claim 1, wherein the motion assistive device comprises the at least one wire, and the at least one wire comprises:
at least one first wire connected to the respective at least one arm; and
at least one second wire connected to the respective at least one arm; and
the fingers are bent by pulling the at least one first wire to pivot the at least one arm in one direction, and the fingers are stretched by pulling the at least one second wire to pivot the at least one arm in the opposite direction from the pivot in one direction.

12. The motion assistive device of claim 1, wherein the at least one arm is a plurality of arms, the at least one connective member is a plurality of connective members, and each of the plurality of arms is attached to corresponding one finger by each of the plurality of connective members.

13. The motion assistive device of claim 1, the base member and the at least one attachment member are configured so that a position of the center of pivot of the at least one arm can be adjusted in a direction of width of the hand.

14. The motion assistive device of claim 1 further comprising a stopper configured to extend from a bottom of the at least one attachment member and restrict movement of a proximal phalanx of the fingers of the user by abutting the proximal phalanx.

15. The motion assistive device of claim 1, wherein the base member and the at least one attachment member are configured so that a position of attaching the at least one arm to the base member can be adjusted in a longitudinal direction of the fingers.

16. The motion assistive device of claim 15, wherein the base member is configured so that a position where the at least one attachment member is fixed to the base member can be adjusted in a longitudinal direction of the fingers.

17. The motion assistive device of claim 4, wherein the at least one arm comprises a plurality of arms, the plurality of arms comprising:

a first arm connected to the base member via the at least one ball joint; and a second arm connected to the base member without the at least one ball joint interposed therebetween.

18. The motion assistive device of claim 4, wherein the at least one ball joint is configured to be selectively attachable to both a first side and a second side of the base member.

19. The motion assistive device of claim 14, wherein the base member has an anterior side, which is a side towards which the at least one arm extends, and a posterior side, which is the opposite side from the anterior side, wherein the base member has a flat surface that is substantially parallel to the back of the hand, and wherein the stopper is configured to be substantially parallel to the flat surface and extend towards the anterior side.

\* \* \* \* \*